(12) United States Patent
Dong

(10) Patent No.: US 10,666,356 B2
(45) Date of Patent: May 26, 2020

(54) VISIBLE LIGHT-BASED COMMUNICATION METHOD, RELATED DEVICE, AND RELATED SYSTEM

(71) Applicant: HUAWEI TECHNOLOGIES CO., LTD., Shenzhen, Guangdong (CN)

(72) Inventor: Chen Dong, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/172,544

(22) Filed: Oct. 26, 2018

(65) Prior Publication Data

US 2019/0068283 A1 Feb. 28, 2019

Related U.S. Application Data

(63) Continuation of application No. PCT/CN2016/080842, filed on Apr. 29, 2016.

(51) Int. Cl.
*H04B 10/114* (2013.01)
*H04B 10/116* (2013.01)
(Continued)

(52) U.S. Cl.
CPC ....... *H04B 10/1149* (2013.01); *H04B 10/116* (2013.01); *H04B 10/1143* (2013.01); *H04W 76/11* (2018.02); *H04W 80/02* (2013.01)

(58) Field of Classification Search
CPC .............. H04B 10/1149; H04B 10/116; H04B 10/1143
See application file for complete search history.

(56) References Cited

U.S. PATENT DOCUMENTS

| 2012/0093517 A1* | 4/2012 | Rajagopal | H04B 10/116 398/130 |
| 2013/0218769 A1* | 8/2013 | Pourfallah | G06Q 20/10 705/44 |

(Continued)

FOREIGN PATENT DOCUMENTS

| CN | 103220760 A | 7/2013 |
| CN | 104022821 A | 9/2014 |

(Continued)

OTHER PUBLICATIONS

"IEEE Standard for Local and Metropolitan Area Networks—Part 15.7:Short-Range Wireless Optical Communication Using Visible Light;IEEE Std 802.15.7-2011", IEEE Standard, Sep. 6, 2011, XP017694867, 310 pages.

*Primary Examiner* — Dzung D Tran
(74) *Attorney, Agent, or Firm* — Womble Bond Dickinson (US) LLP

(57) ABSTRACT

Embodiments of the present application disclose a visible light-based communication method, a related device, and a related system. A first VLC device is configured to send a reporting indication message to a coordinator when a VPAN ID conflict occurs on a VPAN. The reporting indication message includes VPAN ID information detected by the first VLC device. A coordinator device is configured to receive the reporting indication message sent by the first VLC device. A coordinator device is configured to select a new VPAN ID based on the VPAN ID information to resolve the VPAN ID conflict effectively.

16 Claims, 11 Drawing Sheets

(51) Int. Cl.
*H04W 76/11* (2018.01)
*H04W 80/02* (2009.01)

(56) References Cited

U.S. PATENT DOCUMENTS

| | | |
|---|---|---|
| 2014/0250498 A1 | 9/2014 | Yamasaki et al. |
| 2015/0318922 A1 | 11/2015 | Poola et al. |
| 2015/0319639 A1* | 11/2015 | Poola .................. H04L 61/6077 398/25 |
| 2016/0335917 A1* | 11/2016 | Lydecker ............. G09B 21/008 |
| 2017/0027851 A1 | 2/2017 | Ran et al. |

FOREIGN PATENT DOCUMENTS

| | | |
|---|---|---|
| JP | 2014082549 A | 5/2014 |
| WO | 2014085124 A1 | 6/2014 |
| WO | 2016049837 A1 | 4/2016 |

\* cited by examiner

VISIBLE LIGHT-BASED COMMUNICATION METHOD, RELATED DEVICE, AND RELATED SYSTEM

CROSS-REFERENCE TO RELATED APPLICATIONS

This application is a continuation of International Application No. PCT/CN2016/080842, filed on Apr. 29, 2016, the disclosure of which is hereby incorporated by reference in its entirety.

TECHNICAL FIELD

The present application relates to the field of communications technologies, and in particular, to a visible light-based communication method, a related device, and a related system.

BACKGROUND

In recent years, visible light communication (VLC) technologies have developed at a growing pace and evolved as rising wireless communications technologies. VLC is a communication manner in which an electromagnetic wave within a range of a visible light frequency band is used as a transmission medium for communication. A principle of the VLC is implementing signal transmission by changing intensity of a light emitting diode (LED) light source. As light intensity changes at relatively high frequency, human eyes cannot discover a light source change. Therefore, a communication function can be implemented while a basic illumination function is implemented. Compared with a conventional wireless communications technology, the VLC technologies have many advantages such as a wide available spectrum, no electromagnetic interference, widely distributed infrastructures, being safe to human body, and high confidentiality. Therefore, in recent years, the VLC technologies have been attached with importance in academia and in industry and have entered a rapid development period.

In the prior art, one VLC network is referred to as a visible light communication personal area network (VPAN). FIG. 1 shows a VPAN in a star topology. The VPAN includes a coordinator and a plurality of VLC devices. The coordinator is a master node (usually acted by an LED light on a ceiling) on the VPAN, being responsible for establishing and managing the VPAN and providing network access for the VLC devices (usually acted by various consumer electronics integrated with a VLC transceiver, such as a smartphone, a tablet computer, or a PC). The VLC devices access, by using visible light as a transmission carrier and by using the coordinator, the VPAN for communication.

According to the IEEE 802.15.7 standard, a coordinator needs to perform active scanning before establishing a new VPAN as well as after detecting a VPAN identifier (VPAN ID) conflict event. An objective of active VPAN scanning is to receive, as more as possible, a beacon broadcast by a coordinator of another VPAN, so as to learn information about the another VPAN. Certainly, this information includes VPAN ID information of the another VPAN. The coordinator needs to select, for the VPAN, a VPAN ID different from that of the another VPAN after active scanning ends, so as to avoid a VPAN ID conflict.

However, according to a light intensity distribution calculation formula of the Lambertian radiation model, it can be learned that a probability that LED lights deployed on ceilings on a same horizontal plane correctly receive a signal of another LED light is extremely low; therefore, a probability that a coordinator successfully receives a beacon from another coordinator is also extremely low. Therefore, a prior-art method in which a coordinator on a VPAN network receives a beacon needs to be advanced.

SUMMARY

In at least one embodiment, a visible light-based communication method, a related device, and a related system are provided, so as to implement beacon optimization.

In an embodiment, a visible light-based communication method applied to a visible light communication personal area network VPAN system is provided, where the VPAN includes a coordinator and at least one visible light communication VLC device. The method may include: sending, by a first VLC device, a reporting indication message to the coordinator when a VPAN ID conflict occurs on the VPAN, where the reporting indication message includes VPAN ID information detected by the first VLC device; receiving, by the coordinator, the reporting indication message sent by the first VLC device; and selecting, by the coordinator, a new VPAN ID based on the VPAN ID information; in this way, VPAN ID information that cannot be directly obtained by the coordinator on the VPAN from another coordinator is received and forwarded by a VLC device on the VPAN; and a location relationship between the VLC device and the another coordinator determines that it is easier for the VLC device to obtain VPAN ID information of a VPAN on which the another coordinator resides, so that a VPAN ID conflict can be effectively resolved, the running efficiency of the VPAN system is improved, and a beacon optimization problem is resolved.

In one embodiment, the selecting, by the coordinator, a new VPAN ID based on the VPAN ID information is performed as follows: selecting, by the coordinator, a VPAN ID that is different from a VPAN ID included in the VPAN ID information. The coordinator selects the ID that is different from the VPAN ID included in the VPAN ID information and uses the ID as the new VPAN ID, so as to avoid that a conflict occurs again.

In one embodiment, after the selecting, by the coordinator, a new VPAN ID based on the VPAN ID information, the method includes: generating, by the coordinator, a coordinator realignment message, and sending the coordinator realignment message to the at least one VLC device on the VPAN, where the coordinator realignment message includes the new VPAN ID and an effective time; receiving, by the at least one VLC device on the VPAN, the coordinator realignment message; and using, by the coordinator and the at least one VLC device, the new VPAN ID at the effective time. In one embodiment, after selecting the new VPAN ID, the coordinator generates a related message to notify a VLC device on the VPAN that the VPAN on which the coordinator resides switches to the new VPAN ID, so that the VLC device on the VPAN start to use the new VPAN ID.

In one embodiment, before the sending, by a first VLC device, a reporting indication message to the coordinator, the method includes: after the first VLC device detects that the VPAN ID conflict occurs on the VPAN, detecting, by the first VLC device, neighbor VPAN information within a first preset time, and generating the reporting indication message, where the neighbor VPAN information includes the VPAN ID information, and the reporting indication message is further used to report the VPAN ID conflict to the coordinator. That is, the VPAN ID conflict is discovered and reported by the first VLC device, and the reported indication message includes the neighbor VPAN information that is detected within a time period. Therefore, more neighbor VPAN ID information can be detected, and a probability that a VPAN ID conflict subsequently occurs is reduced.

In one embodiment, before the sending, by a first VLC device, a reporting indication message to the coordinator, the method includes: generating, by the first VLC device, the reporting indication message after detecting that the VPAN ID conflict occurs on the VPAN, where the reporting indication message is further used to report the VPAN ID conflict to the coordinator. That is, the VPAN ID is discovered and reported by the first VLC device, and the VPAN ID conflict is reported immediately after being discovered. The VPAN ID information included in the reported indication message may be neighbor VPAN ID information detected by the first VLC device when or before the VPAN ID conflict is discovered. This improves efficiency of reporting the conflict and feeding back VPAN ID information by a VLC device after the VLC device discovers a conflict.

In one embodiment, before the sending, by a first VLC device, a reporting indication message to the coordinator, the method includes: sending, by a second VLC device, a VPAN ID conflict indication message to the coordinator after detecting that the VPAN ID conflict occurs on the VPAN, where the VPAN ID conflict indication message is used to report the VPAN ID conflict to the coordinator; receiving, by the coordinator, the VPAN ID conflict indication message sent by the second VLC device; sending, by the coordinator, a reporting request message to the first VLC device, where the reporting request message is used to request the VLC device to send detected neighbor VPAN information to the coordinator, and the neighbor VPAN information includes the VPAN ID information; receiving, by the first VLC device, the reporting request message sent by the coordinator; and generating, by the first VLC device, the reporting indication message based on the detected neighbor VPAN information, where the neighbor VPAN information carries the VPAN ID information. In one embodiment, the conflict is reported by the second VLC device other than the first VLC device, and after learning of the conflict, the coordinator appoints the first VLC device to feed back the VPAN ID information. In this way, implementations described in the present application are more diversified and flexible, and the coordinator can actively select, based on calculation and prediction performed by the coordinator, a related VLC device to report the VPAN ID information, so as to obtain the VPAN ID information more pertinently.

In one embodiment, the method further includes: maintaining, by the at least one VLC device and the coordinator that are on the VPAN, respective local neighbor VPAN information, and reporting, by the at least one VLC device, the local neighbor VPAN information to the coordinator periodically or based on a trigger condition, where the neighbor VPAN information includes VPAN ID information; receiving, by the coordinator, the reported local neighbor VPAN information; and maintaining, by the coordinator, global neighbor VPAN information based on the reported local neighbor VPAN information that is received and the local neighbor VPAN information maintained by the coordinator; and the selecting, by the coordinator, a new VPAN ID based on the VPAN ID information includes: updating, by the coordinator, the global neighbor VPAN information based on the VPAN ID information in the reporting indication message, and selecting a new VPAN ID based on the updated global neighbor VPAN information. In one embodiment, a process of detecting and maintaining the VPAN ID information by a VLC device and the coordinator is added, so that the coordinator can learn of global neighbor VPAN information in real time. In this way, when a VPAN ID conflict occurs, more comprehensive neighbor VPAN information can be quickly obtained. This helps select a new VPAN ID to avoid, as far as possible, that a conflict occurs again, and improves the running efficiency of the VPAN system.

In an embodiment, a visible light-based communication method applied to a visible light communication personal area network VPAN system is provided, where the VPAN includes a coordinator and at least one visible light communication VLC device, and the method may include:

sending, by a first VLC device, a reporting indication message to the coordinator when a VPAN ID conflict occurs on the VPAN, where the reporting indication message includes VPAN ID information detected by the first VLC device.

In one embodiment, before the sending, by a first VLC device, a reporting indication message to the coordinator, the method includes: after the first VLC device detects that the VPAN ID conflict occurs on the VPAN, detecting, by the first VLC device, neighbor VPAN information within a first preset time, and generating the reporting indication message, where the neighbor VPAN information carries the VPAN ID information, and the reporting indication message is further used to report the VPAN ID conflict to the coordinator.

In one embodiment, before the sending, by a first VLC device, a reporting indication message to the coordinator, the method includes: generating, by the first VLC device, the reporting indication message after detecting that the VPAN ID conflict occurs on the VPAN, where the reporting indication message is further used to report the VPAN ID conflict to the coordinator.

In one embodiment, before the sending, by a first VLC device, a reporting indication message to the coordinator, the method includes: receiving, by the first VLC device, a reporting request message sent by the coordinator, where the reporting request message is used to request the VLC device to send detected neighbor VPAN information to the coordinator, the neighbor VPAN information includes the VPAN ID information, the reporting request message is a message sent by the coordinator to the first VLC device after the coordinator receives a VPAN ID conflict indication message, and the VPAN ID conflict indication message is a message sent by a second VLC device to the coordinator after the second VLC device detects that the VPAN ID conflict occurs on the VPAN; and generating, by the first VLC device, the reporting indication message based on the detected neighbor VPAN information, where the neighbor VPAN information carries the VPAN ID information.

In one embodiment, the VPAN ID information is used by the coordinator to update global neighbor VPAN information based on the VPAN ID information and select a new VPAN ID based on the updated global neighbor VPAN information; the global neighbor VPAN information is neighbor VPAN information maintained by the coordinator based on reported local neighbor VPAN information that is received and local neighbor VPAN information maintained by the coordinator; the reported local neighbor VPAN information is neighbor VPAN information that is maintained by the at least one VLC device on the VPAN and that is reported, periodically or based on a trigger condition, to the coordinator; the local neighbor VPAN information maintained by the coordinator is neighbor VPAN information maintained by the coordinator; and the neighbor VPAN information includes VPAN ID information.

In, an embodiment, a visible light-based communication method applied to a visible light communication personal area network VPAN system is provided, where the VPAN includes a coordinator and at least one visible light communication VLC device, and the method may include:

when a VPAN ID conflict occurs on the VPAN, receiving, by the coordinator, a reporting indication message sent by a first VLC device, where the reporting indication message includes VPAN ID information detected by the first VLC device; and selecting, by the coordinator, a new VPAN ID based on the VPAN ID information.

In one embodiment, the selecting, by the coordinator, a new VPAN ID based on the VPAN ID information includes: selecting, by the coordinator, a VPAN ID that is different from a VPAN ID included in the VPAN ID information.

In one embodiment, after the selecting, by the coordinator, a new VPAN ID based on the VPAN ID information, the method includes: generating, by the coordinator, a coordinator realignment message, and sending the coordinator realignment message to the at least one VLC device on the VPAN, where the coordinator realignment message includes the new VPAN ID and an effective time; and using, by the coordinator and the at least one VLC device, the new VPAN ID at the effective time.

In one embodiment, the reporting indication message is a message generated after the first VLC device detects, within a first preset time, neighbor VPAN information and the first VLC device detects that the VPAN ID conflict occurs on the VPAN, the neighbor VPAN information carries the VPAN ID information, and the reporting indication message is further used to report the VPAN ID conflict to the coordinator.

In one embodiment, the reporting indication message is a message generated after the first VLC device detects that the VPAN ID conflict occurs on the VPAN, and the reporting indication message is further used to report the VPAN ID conflict to the coordinator.

In one embodiment, before the receiving, by a coordinator, a reporting indication message sent by a first VLC device, the method includes: receiving, by the coordinator, a VPAN ID conflict indication message sent by a second VLC device, where the VPAN ID conflict indication message is used to report the VPAN ID conflict to the coordinator; and sending, by the coordinator, a reporting request message to the first VLC device, where the reporting request message is used to request the VLC device to send detected neighbor VPAN information to the coordinator, and the neighbor VPAN information includes the VPAN ID information.

In one embodiment, the method further includes: maintaining, by the coordinator, local neighbor VPAN information; receiving, by the coordinator, reported local neighbor VPAN information, where the reported local neighbor VPAN information is neighbor VPAN information that is maintained by the at least one VLC device on the VPAN and that is reported, periodically or based on a trigger condition, to the coordinator, and the neighbor VPAN information includes VPAN ID information; and maintaining, by the coordinator, global neighbor VPAN information based on the reported local neighbor VPAN information that is received and the local neighbor VPAN information maintained by the coordinator; and the selecting, by the coordinator, a new VPAN ID based on the VPAN ID information includes: updating, by the coordinator, the global neighbor VPAN information based on the VPAN ID information in the reporting indication message, and selecting a new VPAN ID based on updated global neighbor VPAN information.

In an embodiment, a visible light-based communication method applied to a visible light communication personal area network VPAN system is provided, where the VPAN includes a coordinator and at least one visible light communication VLC device, and the method may include:

sending, by a first coordinator, a scan request message to a first device by using a backhaul where the first device includes a second coordinator and/or a central controller, the first device and the first coordinator are connected by using the backhaul link, and the scan request message is used to request VPAN ID information from the first device; and receiving, by the first coordinator, a scan confirm message sent by the first device, and selecting a VPAN ID based on the VPAN ID information, where the scan confirm message is sent to the first coordinator after the first device receives the scan request message, and the scan confirm message carries VPAN ID information maintained by the first device.

In one embodiment, the first device includes the second coordinator; and the VPAN ID information maintained by the first device includes VPAN ID information of a VPAN on which the second coordinator resides.

In one embodiment, the first device includes the central controller; and the VPAN ID information maintained by the first device includes VPAN ID information of a VPAN on which a coordinator connected to the central controller by using the backhaul link resides.

In one embodiment, the first device includes the central controller, and the method further includes: reporting, by the first coordinator periodically or based on a trigger condition, VPAN ID information of a VPAN on which the first coordinator resides to the central controller by using the backhaul link.

In one embodiment, before the sending, by a first coordinator, a scan request message to a first device by using a backhaul link, the method includes: receiving, by the first coordinator, a VPAN ID conflict indication message sent by a second device, where the VPAN ID conflict indication message is used to report a VPAN ID conflict to the first coordinator.

In one embodiment, after the selecting, by the first coordinator, a VPAN ID based on the VPAN ID information, the method includes: generating, by the first coordinator, a coordinator realignment message, and sending the coordinator realignment message to the at least one VLC device on the VPAN, where the coordinator realignment message includes the selected VPAN ID and an effective time; and using, by the coordinator and the at least one VLC device, the selected VPAN ID at the effective time.

In one embodiment, the sending, by a first coordinator, a scan request message to a first device by using a backhaul link includes: before establishing the VPAN, sending, by the first coordinator, the scan request message to the first device by using the backhaul link.

In one embodiment, after the selecting, by the first coordinator, a VPAN ID based on the VPAN ID information, the method includes: broadcasting, by the first coordinator, a beacon, where the beacon includes the selected VPAN ID.

In one embodiment, the selecting, by the first coordinator, a VPAN ID based on the VPAN ID information includes: selecting, by the first coordinator, a VPAN ID that is different from a VPAN ID included in the VPAN ID information.

In one embodiment, the backhaul link includes a wired link or a wireless link, the wired link includes a power line communication PLC link, an Ethernet Ethernet link, or an optical fiber link, and the wireless link includes a Wi-Fi link, a cellular link, a WiMax link, a Bluetooth link, or a ZigBee link.

In an embodiment, a VLC device, including a module configured to perform the methods described herein.

In an embodiment, the present application provides a network access device, including a module configured to perform the methods described herein.

In one embodiment, the present application provides a network access device, including a module configured to perform the methods described herein.

In one embodiment, the present application provides a device, the device includes a processor, and the processor is configured to support the device in executing a corresponding function in the visible light-based communication methods described herein. The device may further include a memory, and the memory is configured to be coupled to the processor and store a program instruction and data that are necessary for the device. The device may further include a communications interface, configured to perform communication between the device and another device or a communications network.

In one embodiment, the present application provides a device, the device includes a processor, and the processor is configured to support the device in executing a corresponding function in the visible light-based communication methods described herein. The device may further include a memory, and the memory is configured to be coupled to the processor and store a program instruction and data that are necessary for the device. The device may further include a communications interface, configured to perform communication between the device and another device or a communications network.

In one embodiment, the present application provides a device, the device includes a processor, and the processor is configured to support the device in executing a corresponding function in the visible light-based communication methods described herein. The device may further include a memory, and the memory is configured to be coupled to the processor and store a program instruction and data that are necessary for the device. The device may further include a communications interface, configured to perform communication between the device and another device or a communications network is provided.

In one embodiment, a computer storage medium configured to store a computer software instruction used by the device to perform methods as described herein is provided. The computer software instruction includes a program designed for executing the methods described herein.

In one embodiment, a computer storage medium configured to store a computer software instruction used by the device to perform methods described herein is provided. The computer software instruction includes a program designed for executing the methods described herein.

In one embodiment, a computer storage medium configured to store a computer software instruction used by the device to perform methods described herein is provided. The computer software instruction includes a program designed for executing the methods described herein.

In one embodiment, a communications system, including the first VLC device to perform methods described herein is provided.

In one embodiment, in the VPAN system, the VPAN includes a coordinator and at least one visible light communication VLC device, the first VLC device among a plurality of VLC devices in the VPAN system sends the reporting indication message to the coordinator when the VPAN ID conflict occurs on the VPAN, and the reporting indication message includes the VPAN ID information detected by the first VLC device. The coordinator receives the reporting indication message sent by the first VLC device, and selects the new VPAN ID based on the VPAN ID information included in the reporting indication message sent by the first VLC device. That is, when a VPAN ID conflict occurs on the VPAN, according to the embodiments of the application, VPAN ID information that cannot be directly obtained by the coordinator on the VPAN from another coordinator is received and forwarded by a VLC device on the VPAN. A location relationship between the VLC device and the another coordinator determines that it is easier for the VLC device to obtain VPAN ID information of a VPAN on which the another coordinator resides, so that a VPAN ID conflict can be effectively resolved, and the running efficiency of the VPAN system is improved.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings.

DESCRIPTION OF EMBODIMENTS

Figure 1:
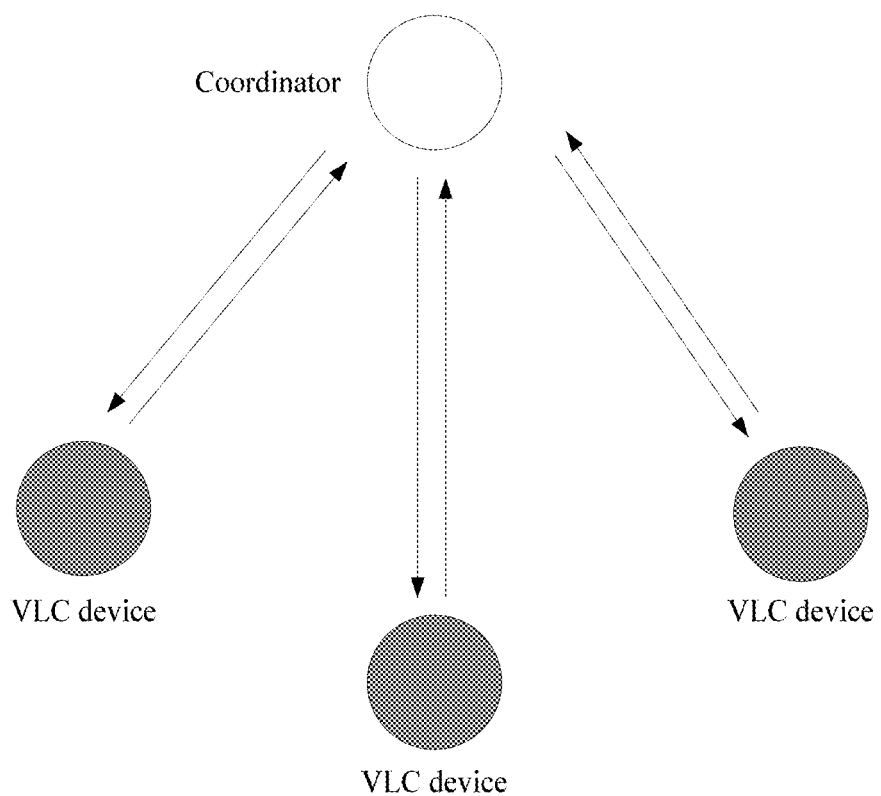
FIG. 1 is a schematic structural diagram of a VPAN in a star topology.

The following describes the technical solutions in the embodiments of the application with reference to the accompanying drawings. Apparently, the described embodiments are merely examples of some but not all of the embodiments of the application. All other embodiments obtained by a person of ordinary skill in the art based on the embodiments described in the present application shall fall within the protection scope of the embodiments of the application.

In the specification, claims, and accompanying drawings, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of operations or units is not limited to the listed operations or units, but optionally further includes an unlisted operation or unit, or optionally further includes another inherent operation or unit of the process, the method, the product, or the device.

Mentioning an "embodiment" in the specification means that a particular characteristic, structure, or feature described with reference to the embodiment may be included in at least one embodiment of the application. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

For ease of understanding by a person skilled in the art, the following explains some terms in this application.

(1) A first VLC device and a second VLC device are devices that can perform visible light communication. For example, the devices may be terminals. The terminal, also referred to as user equipment (UE), is a device providing voice and/or data connectivity for a user, for example, a communications device that has a visible light communication function, such as a smartphone, a tablet computer, a media player, a smart TV, a smart band, an intelligent wearable device, an MP3 player (Moving Picture Experts Group Audio Layer III, moving picture experts group audio layer 3), an MP4 (Moving Picture Experts Group Audio Layer IV, moving picture experts group audio layer 4) player, a personal digital assistant (PDA), a laptop portable computer, or a desktop computer. A coordinator is a master node on a visible light communication personal area network VPAN, provides network access for a terminal on the VPAN, and manages and maintains VPAN running. Usually, the coordinator is acted by a light emitting diode (LED) light on a ceiling. The coordinator may also be a radio access network (RAN) device that has a visible light communication function on an access network side of a cellular network. The so-called RAN device is a device that makes a terminal access a radio network and includes but is not limited to: an evolved NodeB (eNB), a radio network controller (RNC), a NodeB (NB), a base station controller (BSC), a base transceiver station (BTS), a home base station (such as a Home evolved NodeB, HeNB, or a Home NodeB, HNB), or a baseband unit (BBU). For another example, the first VLC device and the second VLC device may also be central controllers. The central controller is a global control node that is connected to coordinators of all VPANs by using wired or wireless connection link and is responsible for coordinating and managing running of the VPANs together.

(2) MAC layer: A MAC layer in the embodiments of the application is a VLC MAC layer, including a data plane and a management plane. The data plane of the MAC layer is responsible for performing MAC framing on service data delivered from a higher layer and splitting a MAC frame handed in by a physical layer. The management plane of the MAC layer is responsible for generating various MAC layer messages, recognizing a message received by the MAC layer, and executing a corresponding processing action based on content of a MAC layer message.

(3) MAC layer management entity (MLME): an MLME is a management plane of a MAC layer, and the management plane is responsible for generating various MAC layer messages, recognizing a message received by the MAC layer, and executing a corresponding processing action based on content of a MAC layer message.

(4) An adjacent higher layer of a MAC layer is protocol layer next to the MAC layer above the MAC layer. The adjacent higher layer may be an abstract layer in the IEEE 1905.1 standard, or may be an IP layer or another protocol layer. This is not limited in the present application. The MAC layer may interact with the adjacent higher layer of the MAC layer by using a primitive.

(5) A primitive is a parameter set exchanged when two adjacent layers in a protocol stack are performing interaction. In the parameter set, there is necessary information provided by one party for the other party in the interaction. In addition to a parameter, for each primitive, a generation condition of the primitive, an objective of primitive interaction, a processing action performed after the other party receives the primitive, and the like are further strictly prescribed. An entire service primitive includes a name, a type, and a parameter. In addition, a generation occasion of the primitive, a usage of the primitive, and an action performed after the primitive is received further need to be prescribed for the primitive.

(6) "A plurality of" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The following describes the embodiments of this application with reference to accompanying drawings.

For ease of understanding the embodiments of the application, the following first describes an architecture of a visible light communication personal area network VPAN system on which the embodiments of the application are based.

Figure 2:
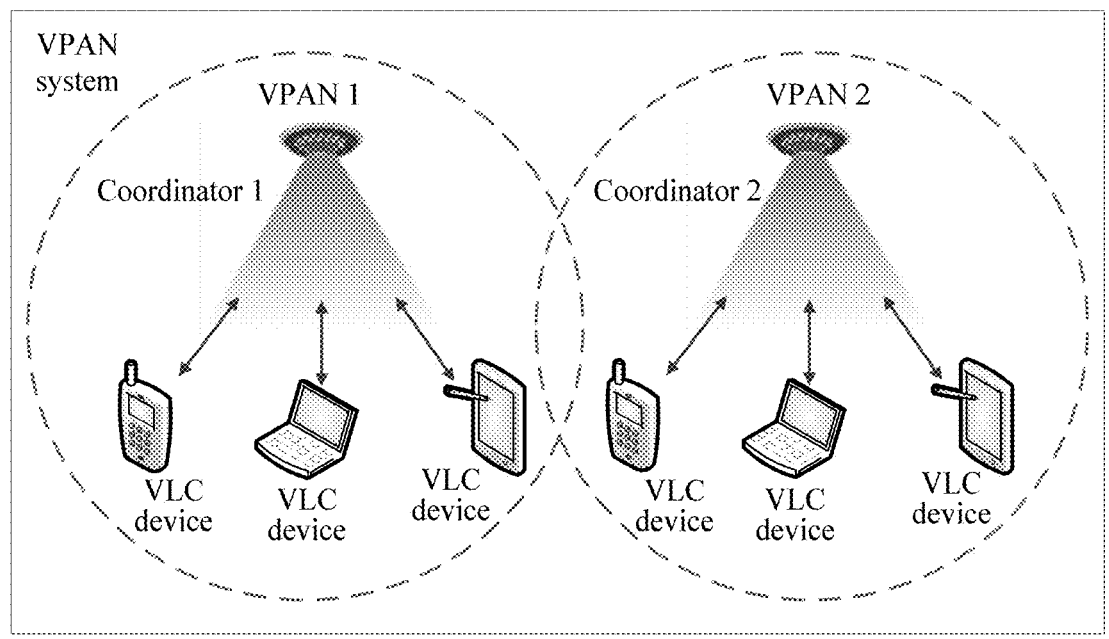
FIG. 2 is an architectural diagram of a VPAN system according to an embodiment of the application.

Referring to FIG. 2, the VPAN system includes a plurality of VPANs (only a VPAN 1 and a VPAN 2 are shown in FIG. 2 as an example). Both the VPAN 1 and the VPAN 2 in the drawing are in a star topology structure. The VPAN 1 and the VPAN 2 each include a coordinator (such as an LED on a ceiling) and at least one VLC device (such as a smartphone, a tablet computer, or a PC that is integrated with a VLC transceiver). The coordinators are master nodes on the VPANs and provide network access for the VLC devices. A coordinator 1 on the VPAN 1 and a coordinator 2 on the VPAN 2 periodically transmit a beacon (the beacon carrying some important information necessary for VPAN running, such as a VPAN ID, a coordinator short address, or resource scheduling information) in a broadcast manner, to provide information necessary for VPAN running for the devices on the VPAN 1 and the VPAN 2. A device on a VPAN keeps synchronization with a coordinator by receiving a beacon, and based on information provided in the beacon, accesses the VPAN and correctly works on the VPAN.

Each VPAN has a VPAN ID used for identifying the VPAN. Therefore, when establishing a VPAN, a coordinator needs to determine a VPAN ID for the to-be-established VPAN. Usually, a standard does not prescribe how a coordinator determines a VPAN ID; however, a coordinator should avoid, as far as possible, selecting a VPAN ID the same as a VPAN ID selected by another VPAN. If two different VPANs select a same VPAN ID, it is considered that the VPAN IDs of the two VPANs conflict with each other. In this case, a VPAN ID conflict needs to be resolved. Because a beacon carries VPAN ID information, if a coordinator and a device can detect a beacon sent by a coordinator of another VPAN, the coordinator and the device can determine whether a VPAN ID of the VPAN conflicts with a VPAN ID of the neighbor VPAN. If a coordinator on a VPAN detects a beacon of a coordinator on another VPAN and discovers that a VPAN ID of the VPAN is the same as a VPAN ID of the another VPAN, it is the coordinator that detects a VPAN ID conflict event. If a device on a VPAN detects a beacon of a coordinator on another VPAN and discovers that a VPAN ID of the VPAN is the same as a VPAN ID of the another VPAN, it is the device that detects a VPAN ID conflict. In this case, the device needs to send a VPAN ID conflict indication message to a coordinator to report the VPAN ID conflict event; therefore, the coordinator can still detect this VPAN ID conflict at last through reporting of the device. Regardless of which method is used to detect the VPAN ID conflict, the coordinator needs to select a new VPAN ID for a VPAN on which the coordinator resides as soon as possible. The coordinator uses a super frame as a time cycle to perform resource scheduling and management on the VPAN, and the coordinator broadcasts a beacon at least once in each super frame.

According to a regulation in the foregoing existing IEEE 802.15.7 standard, before establishing a new VPAN as well as after detecting a VPAN ID conflict event, a coordinator needs to perform active scanning and select an appropriate VPAN ID for the VPAN based on a scanning result. If a beacon cannot be received correctly and reliably, the coordinator cannot effectively learn of a VPAN ID selected for another VPAN; therefore, the coordinator may select an appropriate VPAN ID for the VPAN in a VPAN establishing process and a VPAN ID conflict resolving process, and the VPAN ID selected by the coordinator may conflict with a VPAN ID of the another VPAN again. In this case, the VPAN needs to resolve a VPAN ID conflict again, and resources on the VPAN are consumed in reporting and resolving the VPAN ID conflict, resulting in the low efficiency of VPAN running. A specific active scanning process of the coordinator is as follows: An adjacent higher layer of the device sends a scan request primitive (MLME-SCAN-.request) to an MLME of the device, to request the MLME to perform the active scanning process. Duration required for active scanning is prescribed in this primitive. After receiving the primitive, the MLME of the device generates and broadcasts a beacon request message. The device receives, in the duration for active scanning, a beacon broadcast by another coordinator. When the duration for scanning elapses, the MLME of the device sends a scan confirm primitive (MLME-SCAN.confirm) to the adjacent higher layer of the device, and reports, by using the primitive, information, about all VPANs, detected by the MLME to the adjacent higher layer. The information includes VPAN ID information of a VPAN.

It can be understood that a system to which the embodiments of the application are specifically applied includes but is not limited to the foregoing visible light communication personal area network VPAN system. The embodiments of the application may also be applied to a heterogeneous converged network system to which the visible light communication personal area network VPAN system is converged, such as a Wi-Fi system, a ZigBee system, an IR system, a Bluetooth system, an LTE system, or a GSM system. Any system to which a visible light-based communication method described in the present application can be applied shall fall within the protection scope of the set forth in the claims.

Figure 3:
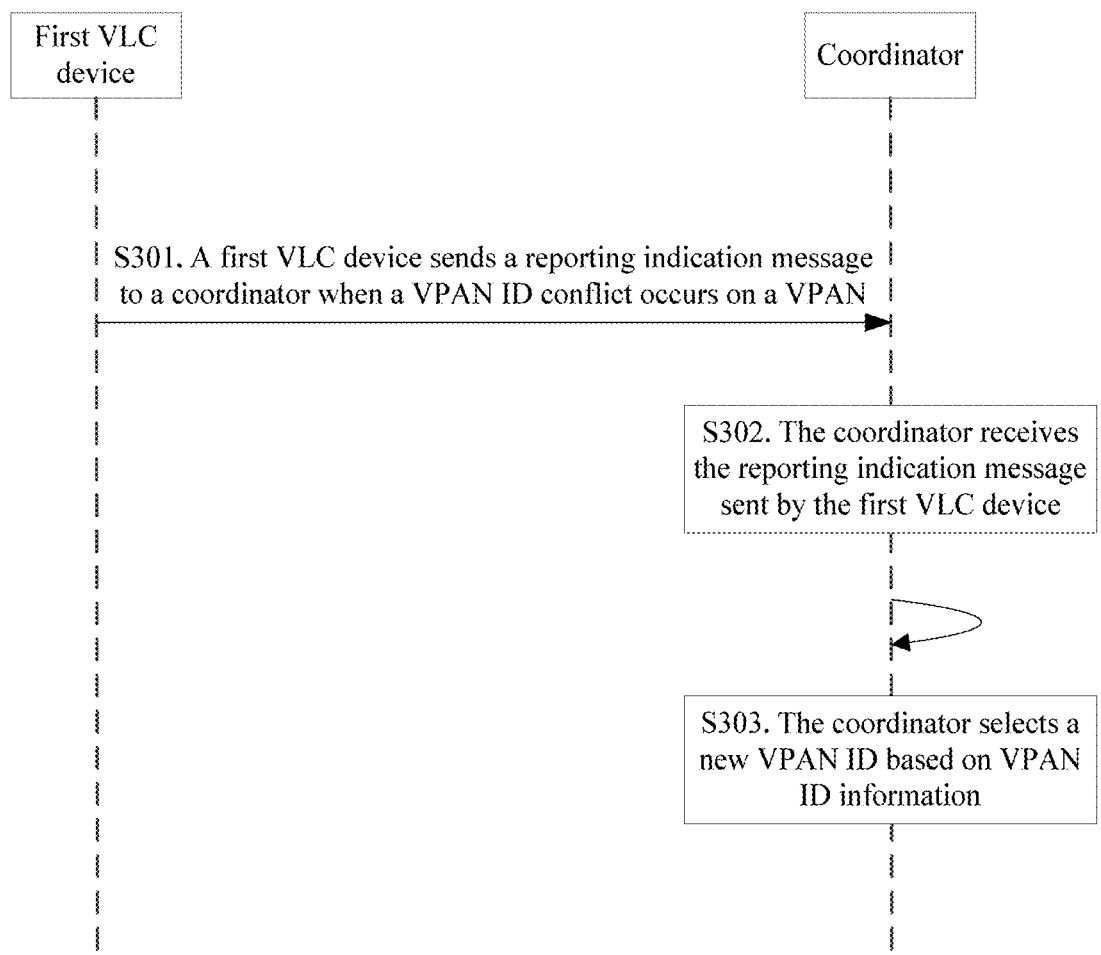
FIG. 3 is a schematic flowchart of a visible light-based communication method according to an embodiment of the application.

Referring to FIG. 3, FIG. 3 is a schematic flowchart of a visible light-based communication method according to an embodiment of the application. The method can be applied to the VPAN system shown in FIG. 2. With reference to FIG. 3, the following describes the method from an interaction side of a VPAN: a first VLC device and a coordinator. A second VLC device and another VLC device are further configured to perform some actions. It should be noted that the first VLC device, the second VLC device, the coordinator, and another related VLC device are devices deployed on a same VPAN. As shown in FIG. 3, the method may include operations S301 to S303.

Operation S301. The first VLC device sends a reporting indication message to the coordinator when a VPAN ID conflict occurs on the VPAN, where the reporting indication message includes VPAN ID information detected by the first VLC device.

Operation S302. The coordinator receives the reporting indication message sent by the first VLC device.

Operation S303. The coordinator selects a new VPAN ID based on the VPAN ID information.

Specifically, the coordinator selects a VPAN ID different from a VPAN ID included in the VPAN ID information, to avoid, as far as possible, a conflict with (being the same as) a VPAN ID that can be learned of by the coordinator, thereby avoiding a conflict that may subsequently occur again. Further, the coordinator generates a coordinator realignment message, and sends the coordinator realignment message to at least one VLC device (which may be one, a plurality of, or all of VLC devices) on the VPAN. The coordinator realignment message includes the foregoing new VPAN ID and an effective time. The at least one VLC device on the VPAN receives the coordinator realignment message. When the effective time arrives, the coordinator and the VLC device that learns of the new VPAN ID start to use the new VPAN ID. In this way, the foregoing VPAN ID conflict on the VPAN is resolved properly.

In operation S301, the case in which it is detected that the VPAN ID conflict occurs on the VPAN may include the following two situations: One is a VLC device on the VPAN discovers the VPAN ID conflict and reports the VPAN ID conflict to the coordinator; the other one is the coordinator discovers the VPAN ID conflict through scanning and may specifically include the following implementations.

Implementation 1

Before the first VLC device sends the reporting indication message to the coordinator, and after the first VLC device detects that the VPAN ID conflict occurs on the VPAN, the first VLC device detects neighbor VPAN information within a preset time period, and generates the reporting indication message. The neighbor VPAN information includes the VPAN ID information, and the reporting indication message is further used to report the VPAN ID conflict to the coordinator. That is, in this method, the VPAN ID conflict is discovered and reported by the first VLC device, and the reported indication message includes the neighbor VPAN information that is detected within the preset time period. Therefore, more neighbor VPAN ID information can be detected, and a probability that a VPAN ID conflict subsequently occurs is reduced. It should be noted that a neighbor VPAN in the embodiments of the application is a VPAN, can be detected by a related VLC device or a coordinator, other than a VPAN on which the related VLC device or the coordinator resides. The neighbor VPAN information in the embodiments of the application includes but is not limited to a VPAN ID of a neighbor VPAN, a coordinator address (short address or MAC address) of the neighbor VPAN, and the like.

A VLC device may detect the neighbor VPAN information in one of the following methods: detection performed through an active scanning process, detection performed through a passive scanning process, or a detection process other than active scanning and passive scanning. This is not limited in the present application.

The active scanning process is described in the foregoing embodiment, and details are not described herein again.

The passive scanning process is as follows: An adjacent higher layer of a device sends a scan request primitive (MLME-SCAN.request) to an MLME of the device, to request the MLME to perform the passive scanning process. Duration required for passive scanning is prescribed in this primitive. After receiving the primitive, the MLME of the device receives, within duration for passive scanning, a beacon broadcast by another coordinator. When the duration for passive scanning elapses, the MLME of the device sends a scan confirm primitive (MLME-SCAN.confirm) to the adjacent higher layer of the device, and reports, by using the primitive, information, about all VPANs, detected by the MLME to the adjacent higher layer. The information includes VPAN ID information of a VPAN.

One of detection methods other than active scanning and passive scanning is as follows: A device detects and receives a MAC frame, other than a beacon, of a neighbor VPAN, to detect neighbor VPAN information. These MAC frames other than a beacon frame include a command frame, a data frame, a control frame, an acknowledgment frame, and the like. A frame header of a MAC frame other than a beacon usually carries VPAN ID information of a VPAN on which a VLC device generating the MAC frame resides; therefore, a VPAN ID of the neighbor VPAN can also be detected by detecting a MAC frame, other than a beacon, of a neighbor VPAN.

Another method of the detection methods other than active scanning and passive scanning is as follows: A device detects a beacon frame of a neighbor VPAN as well as a MAC frame, other than a beacon frame, of the neighbor VPAN.

It should be noted that the detection methods other than active scanning and passive scanning may be set by a coordinator or a device to last for only a time period, or may be performed all through a VPAN running process.

Figure 4:
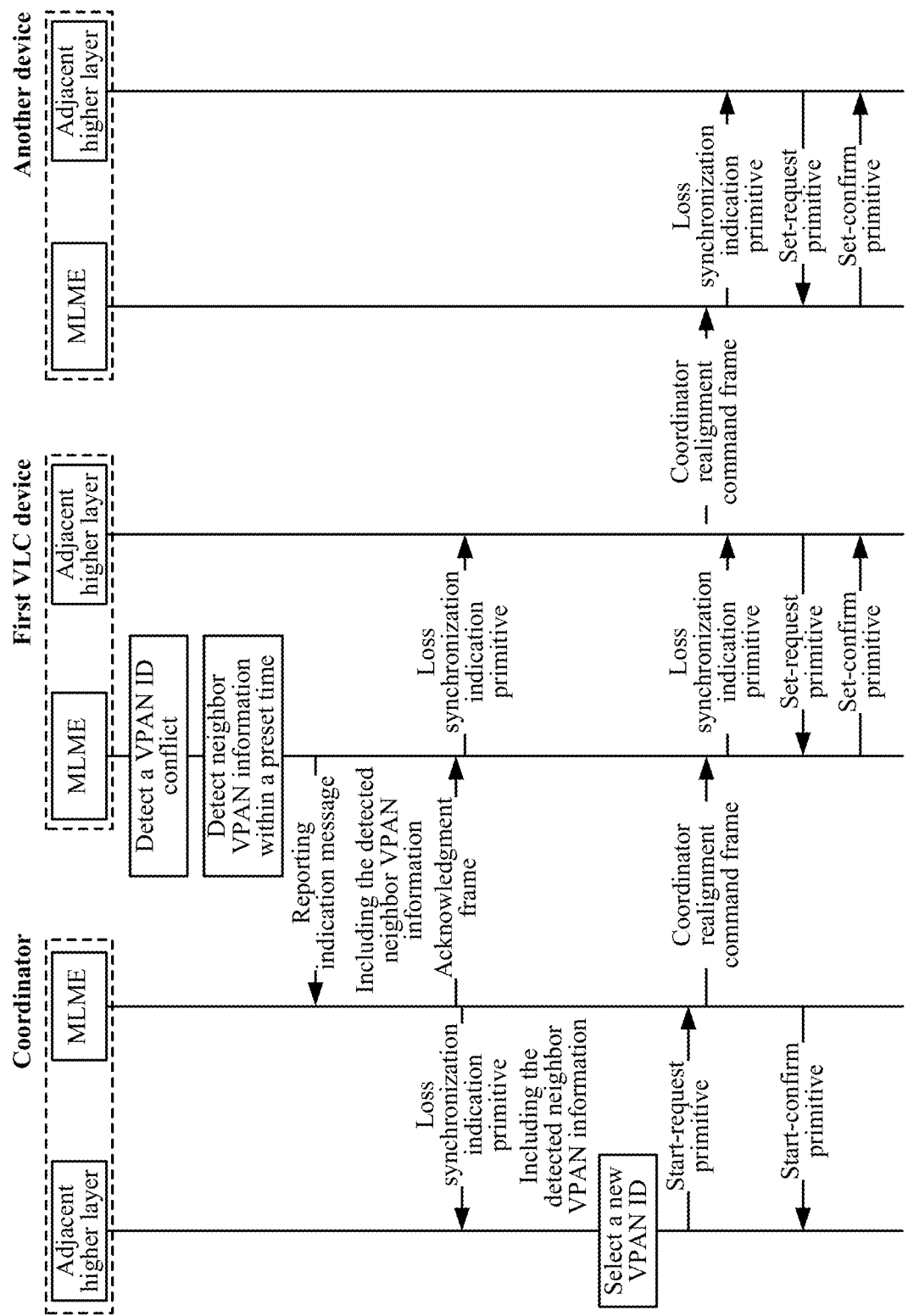
FIG. 4 is a schematic flowchart of an embodiment of a visible light-based communication method according to an embodiment of the application.

With referent to Implementation 1 and operations S301 to S303, a flowchart of a specific execution process of an embodiment of the application is shown in FIG. 4. The specific execution process may be as follows:

(1) After detecting a VPAN ID conflict event (that is, after a first VLC device receives a beacon in which a VPAN ID is the same as a VPAN ID of the VPAN and a coordinator address is different from a coordinator address of the VPAN, it is considered that a VPAN ID conflict event occurs currently), the first VLC device detects neighbor VPAN information within a preset time (for example, a length of the preset time is m super frames). A process of detecting the neighbor VPAN information is described in Implementation 1, and details are not described herein again.

(2) After the detection completes, the first VLC device sends a reporting indication message to a coordinator. The message carries the neighbor VPAN information detected by the device within the preset time period.

(3) After receiving a VPAN ID conflict notification message sent by the first VLC device, an MLME of the coordinator sends a primitive MLME-LOSS-SYNC.indication to an adjacent higher layer of the MLME of the coordinator. The primitive also carries the neighbor VPAN information received by the coordinator from the first VLC device Optionally, after receiving the VPAN ID conflict notification message sent by the first VLC device, the MLME of the coordinator first returns an ACK frame to the first VLC device, and then sends the primitive MLME-LOSS-SYNC.indication to the adjacent higher layer of the MLME of the coordinator.

(4) The adjacent higher layer of the coordinator selects a new VPAN ID for the VPAN based on the neighbor VPAN information reported in the primitive MLME-LOSS-SYNC.indication by the MLME.

Optionally, the adjacent higher layer selects the new VPAN ID for the VPAN in the following method: selecting a VPAN ID different from a VPAN ID of any VPAN in the reported neighbor VPAN information.

In this way, the coordinator has completed a task of selecting the new VPAN ID for the VPAN.

(5) The adjacent higher layer generates a primitive MLME-START.request, and adds the selected new VPAN ID into the primitive. After receiving the primitive, the MLME of the coordinator generates and sends a coordinator realignment message. The message indicates the new VPAN ID and an effective time.

(6) After the device on the VPAN receives the coordinator realignment message, the MLME of the device on the VPAN sends MLME-SYNC-LOSS.indication to the adjacent higher layer. The primitive indicates the received new VPAN ID. After receiving the primitive, the adjacent higher layer instructs, by using a primitive MLME-SET.request, the MLME to update the VPAN ID. When the effective time arrives, the coordinator and the device on the VPAN start to use the new VPAN ID. In this way, a process of VPAN ID conflict detection, reporting, and resolving is complete.

Implementation 2

The foregoing reporting indication message is generated after the first VLC device detects that the VPAN ID conflict occurs on the VPAN and before the first VLC device sends the reporting indication message to the coordinator. The reporting indication message is further used to report the VPAN ID conflict to the coordinator. This implementation differs from Implementation 1 in that after detecting the conflict, the first VLC device can immediately generate the reporting indication message without detecting neighbor VPAN information within a preset time. The reporting indication message may be generated based on VPAN ID information detected and received when the first VLC device discovers the VPAN ID conflict or may be generated based on historical VPAN ID information that is previously detected and maintained by the first VLC device. That is, in this method, the VPAN ID conflict is discovered and reported by the first VLC device, and the conflict is reported immediately after being discovered. The VPAN ID information included in the reporting indication message may be neighbor VPAN ID information that is currently detected or previously detected and maintained by the first VLC device. In this way, efficiency of reporting the VPAN ID conflict and the VPAN ID information after the VLC device discovers the conflict can be improved. It can be understood that the reporting indication message may have a function of indicating that the VPAN ID conflict occurs on the VPAN. That is, the reporting indication message may indicate the conflict by carrying related feature information or by carrying no related feature information. For more specific implementation details, reference may be correspondingly made to the specific process (1) to (6) in Implementation 1.

Implementation 3

Before the first VLC device sends the reporting indication message to the coordinator, a second VLC device sends a VPAN ID conflict indication message to the coordinator after detecting that the VPAN ID conflict occurs on the VPAN, where the VPAN ID conflict indication message is used to report the VPAN ID conflict to the coordinator; the coordinator receives the VPAN ID conflict indication message sent by the second VLC device; the coordinator sends a reporting request message to the first VLC device, where the reporting request message is used to request the VLC device to send detected neighbor VPAN information to the coordinator, and the neighbor VPAN information includes the VPAN ID information; the first VLC device receives the reporting request message sent by the coordinator; and the first VLC device generates the reporting indication message based on the detected neighbor VPAN information, where the neighbor VPAN information carries the VPAN ID information. It should be noted that the neighbor VPAN information detected by the first VLC device in the embodiments of the application may include neighbor VPAN information that is detected and received when the first VLC device discovers the conflict, may include neighbor VPAN information that is previously detected and maintained by the first VLC device, or may include VPAN ID information obtained through detection performed within a preset time after the first VLC device detects the VPAN ID conflict. This is, when the neighbor VPAN information based on which the first VLC device generates reporting indication information is specifically obtained is not specifically limited in the present application. In addition, a process of detecting the neighbor VPAN information by the first VLC device is described in Implementation 1, and details are not described herein again.

Implementation 3 differs from Implementations 1 and 2 in that: in both Implementation 1 and Implementation 2, the first VLC device reports the VPAN ID conflict event to the coordinator after the first VLC device detects the VPAN ID conflict; however, in Implementation 3, it is the second VLC device that reports the VPAN ID conflict to the coordinator immediately after the second VLC device detects the VPAN ID conflict, and after learning of the VPAN ID conflict, the coordinator then instructs the first VLC device on the VPAN (the first VLC device may include the second VLC device) to detect VPAN information of another VPAN.

Figure 5:
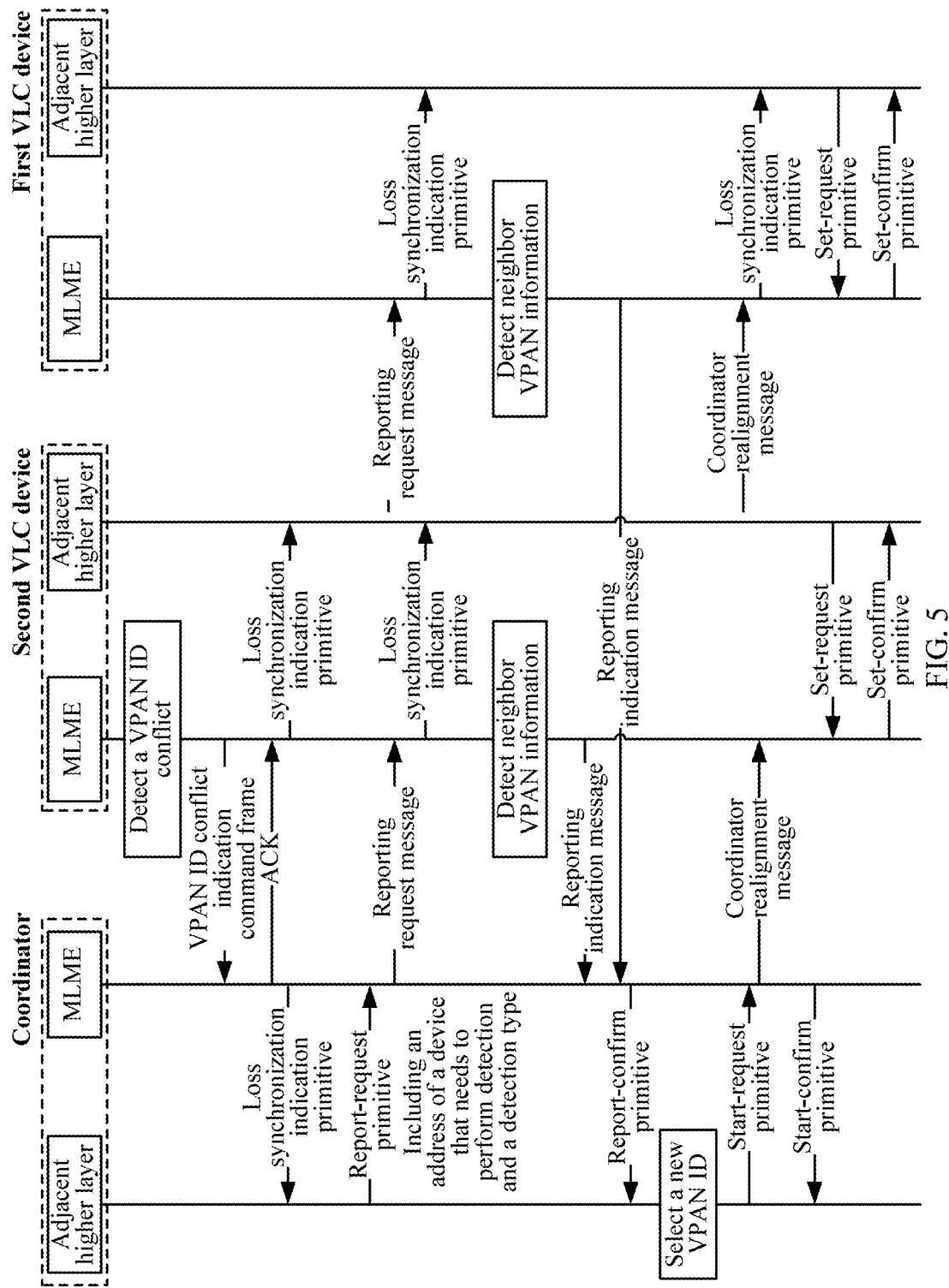
FIG. 5 is a schematic flowchart of another embodiment of a visible light-based communication method according to an embodiment of the application.

With reference to Implementation 3 and operations S301 to S303, a flowchart of a specific execution process of the embodiment of the application is shown in FIG. 5. The specific execution process may be as follows:

(1) After detecting a VPAN ID conflict event (that is, after a second VLC device receives a beacon in which a VPAN ID is the same as a VPAN ID of the VPAN and a coordinator address is different from a coordinator address of the VPAN, it is considered that a VPAN ID conflict event occurs currently), the second VLC device sends a VPAN ID conflict indication message to the coordinator.

(2) After receiving the VPAN ID conflict indication message, an MLME of the coordinator sends a primitive MLME-LOSS-SYNC.indication to an adjacent higher layer of the MLME of the coordinator.

Optionally, after receiving the VPAN ID conflict indication message sent by the second VLC device, the MLME of the coordinator first returns an ACK frame to the second VLC device, and then sends the primitive MLME-LOSS-SYNC.indication to the adjacent higher layer of the MLME of the coordinator.

(3) After receiving the primitive MLME-LOSS-SYNC.indication, the adjacent higher layer of the coordinator learns that the VPAN ID conflict event occurs currently. Therefore, the adjacent higher layer of the coordinator generates a report-request primitive, and sends the primitive to the MLME of the coordinator.

Optionally, the report-request primitive carries address information of a device that needs to execute detection and/or detection type information. The address information of the device that needs to execute detection is used to indicate which device needs to detect neighbor VPAN information. The detection type information is used to indicate whether active scanning, passive scanning, or a detection method other than active scanning and passive scanning should be performed by the device. All the foregoing three detection methods are described in Implementation 1, and details are not described herein again.

(4) After receiving the report-request primitive, the MLME of the coordinator generates the reporting request message and sends the reporting request message to the first VLC device. The first VLC device may be all devices on the VPAN, or may be some devices, on the VPAN, selected by the coordinator. It can be understood that the first VLC device may include the second VLC device or may not include the second VLC device. As shown in FIG. 5, FIG. 5 shows a case in which the second VLC device is included. If there are a plurality of first VLC devices, the coordinator may choose to send the reporting request message to the first VLC devices in any one of the following sending manners: broadcast, multicast, or unicast.

Optionally, the reporting request message further carries the detection type information. That is, the coordinator indicates, in the reporting request message, which type of detection should be executed by the first VLC device to detect the neighbor VPAN information.

(5) After receiving the reporting request message, the first VLC device starts to detect neighbor VPAN information.

Optionally, if the reporting request message carries the detection type information, the first VLC device executes detection based on a requirement described in the message.

Optionally, after receiving the reporting request message of the coordinator, an MLME of the first VLC device first sends a loss synchronization indication primitive to the adjacent higher layer of the MLME of the first VLC device, and then performs a detection process.

(6) After executing detection based on a requirement, the first VLC device returns a reporting indication message to the coordinator. The reporting indication message carries at least the VPAN ID information, of a neighbor VPAN, detected by the first VLC device.

It should be noted that, in operations (5) and (6), after receiving the reporting request message sent by the coordinator, the first VLC device detects the VPAN ID information, and then reports a detection result to the coordinator; however, in an embodiment of the application, after receiving the reporting request message, the first VLC device may alternatively feed back VPAN ID information that is previously detected or maintained. Therefore, operations (5) and (6) may be replaced by using this manner, and details are not described herein.

(7) After receiving the reporting indication message of the first VLC device, the MLME of the coordinator generates a report-confirm primitive, and sends the report-confirm primitive to the adjacent higher layer of the coordinator.

Optionally, the MLME of the coordinator may send a report-confirm primitive to the adjacent higher layer each time the MLME of the coordinator receives a reporting indication message. In this case, the primitive includes only VPAN ID information detected by a device that sends the reporting indication message. Alternatively, the MLME of the coordinator sends a report-confirm primitive to the adjacent higher layer of the MLME of the coordinator only after the MLME of the coordinator receives reporting indication messages of all first VLC devices. In this case, the primitive includes VPAN ID information, of a neighbor VPAN, detected by all first VLC devices. Alternatively, if the coordinator cannot collect reporting indication messages of all first VLC devices within a specified time, the coordinator considers that a first VLC device that sends no reporting indication message (or the first VLC device may send a reporting indication message but the reporting indication message is not received by the coordinator; however, because the coordinator cannot distinguish the two cases, the coordinator regards both cases as that the first VLC device sends no reporting indication message) fails to execute detection, and the MLME of the coordinator also reports, by using a report indication primitive, information about a device that fails to execute the detection to the adjacent higher layer.

(8) The adjacent higher layer of the coordinator selects a new VPAN ID for the VPAN.

Optionally, the adjacent higher layer selects the new VPAN ID for the VPAN in the following method: selecting a VPAN ID different from a VPAN ID of any VPAN in the reported neighbor VPAN information.

In this way, the coordinator has completed a task of selecting the new VPAN ID for the VPAN.

(9) The adjacent higher layer generates a primitive MLME-START.request, and adds the selected new VPAN ID into this primitive. After receiving the primitive, the MLME of the coordinator generates and sends a coordinator realignment message. The message indicates the new VPAN ID and an effective time.

(10) After a device on the VPAN receives the coordinator realignment message, an MLME of the device on the VPAN sends MLME-SYNC-LOSS.indication to an adjacent higher layer. The primitive indicates the received new VPAN ID. After receiving the primitive, the adjacent higher layer instructs, by using a primitive MLME-SET.request, the MLME to update the VPAN ID. When the effective time arrives, the coordinator and the device on the VPAN start to use the new VPAN ID. In this way, a process of VPAN ID conflict detection, reporting, and resolving is complete.

Based on an embodiment, further, when the coordinator performs active scanning according to the prior art but does not find any beacon (or although some beacons are found), the coordinator still has a reason to suspect that beacons of some coordinators are not received by the coordinator in this scanning process. Therefore, the coordinator further instructs, according to the method described in Implementation 3, a VLC device to perform searching again, or the coordinator performs searching by using a backhaul link that is to be described as follows.

Implementation 4

The at least one VLC device and the coordinator that are on the VPAN each maintain respective local neighbor VPAN information, and the at least one VLC device reports the local neighbor VPAN information to the coordinator periodically or based on a trigger condition. The neighbor VPAN information includes VPAN ID information. The coordinator receives the reported local neighbor VPAN information, and the coordinator maintains global neighbor VPAN information based on the reported local neighbor VPAN information that is received and the local neighbor VPAN information maintained by the coordinator. Specifically, one or more VLC devices on the VPAN or even all VLC devices and the coordinator that are on the VPAN can maintain respective local neighbor information. The local neighbor VPAN information is neighbor VPAN information detected by a VLC device and a coordinator by receiving a beacon or another MAC frame from a neighbor VPAN. The local neighbor VPAN information is stored and maintained by a device executing detection and a coordinator separately. In addition, the VLC device further needs to report, periodically (for example, report once every 2 super frames) or based on a condition (for example, a new neighbor VPAN is detected or a VPAN that can be detected previously has not been detected within a plurality of successive super frames), the local neighbor VPAN information separately maintained by the VLC device to the coordinator. The VLC device reports the local neighbor VPAN information by sending a reporting indication message to the coordinator. Further, the coordinator further needs to maintain the global neighbor VPAN information. The global neighbor VPAN information is maintained by combining the local neighbor VPAN information reported by the VLC device and the local neighbor VPAN information maintained by the coordinator. Both the local neighbor VPAN information of the VLC device and the local neighbor VPAN information of the coordinator are dynamic in real time, and the VLC device also reports the local neighbor VPAN information in real time; therefore, the global neighbor VPAN information maintained by the coordinator may be updated dynamically.

With reference to the Implementation 4, a specific execution process of operation S303 in an embodiment of the application is as follows: The coordinator updates the global neighbor VPAN information based on the VPAN ID information in the reporting indication message, and selects a new VPAN ID based on updated global neighbor VPAN information. That is, the coordinator maintains the global neighbor VPAN information according to the local neighbor VPAN information maintained by the coordinator and the neighbor VPAN information reported by the VLC device, so that when a VPAN ID conflict occurs subsequently, the coordinator can select a new VPAN ID based on the global neighbor VPAN information, and update the global neighbor VPAN information based on the VPAN ID information in the reporting indication message after the first VLC device sends the reporting indication message, so as to properly select a VPAN ID that is not currently used, and avoid that a VPAN ID conflict occurs again.

Implementation 4 differs from Implementation 1, 2, and 3 in that: in Embodiment 4, the global neighbor VPAN information is maintained by the coordinator, and after the coordinator discovers the VPAN ID conflict though reporting of the VLC device, the coordinator may update the maintained global neighbor VPAN information based on the reporting indication message sent by the first VLC device, and select the new VPAN ID based on updated global VPAN information. It should be noted that Implementation 4 may further be implemented in combination with reference to Implementation 1, 2, or 3 separately, so as to further describe how the coordinator learns of the VPAN ID conflict. For a condition in which the first VLC device sends the reporting indication message to the coordinator and specific content and a function of the reporting indication message, reference may correspondingly be made to Implementations 1, 2, and 3. Details are not described herein again.

With reference to Implementation 4 and operations S301 to S303. A specific execution process of an embodiment of the application may be as follows.

(1) A VLC device and a coordinator that are on a VPAN system each maintain local neighbor VPAN information. The VLC device and the coordinator obtain and maintain neighbor VPAN detection information in the following method:

Once each VLC device (including the coordinator) on the VPAN detects and receives a beacon frame or another MAC frame from another VPAN, and if the beacon frame or the MAC frame includes a piece of VPAN ID information that is not detected previously, the VLC device and the coordinator add a new VPAN ID into the local neighbor VPAN information separately maintained by the VLC device and the coordinator, and records a time at which the VPAN ID is detected. There is an aging time for each item recorded in the local neighbor VPAN information, that is, after a VPAN ID is recorded, if the VPAN ID cannot be detected again by the VLC device and the coordinator within the aging time, the VPAN ID recorded is deleted from the local neighbor VPAN information. If the VLC device and the coordinator detect the VPAN ID again within the aging time, the VLC device and the coordinator need to update detection time corresponding to the VPAN ID to time of this detection. In addition, the VLC device further needs to report, periodically or based on a condition, the local neighbor VPAN information of the VLC device to the coordinator. For example, the VLC device sends a reporting indication message to the coordinator once every 2 super frames, or each time the VLC device detects a new neighbor VPAN ID, the VLC device sends a reporting indication message to the coordinator, or the VLC device sends a reporting indication message to the coordinator after the VLC device deletes an item recorded corresponding to a neighbor VPAN ID. Alternatively, the VLC device not only needs to periodically send a reporting indication message to the coordinator but also needs to send a reporting indication message to the coordinator when the foregoing conditions are met. The neighbor VPAN information may include a VPAN ID, a coordinator address (a short address or a MAC address), and the like.

The coordinator maintains global neighbor VPAN information based on local neighbor VPAN information reported by each VLC device and the local neighbor VPAN information maintained by the coordinator. A plurality of methods may be used for the coordinator to maintain the global neighbor VPAN information, and which method is specifically used is not limited in the present application. For example, the coordinator collects local neighbor VPAN information reported by all VLC devices and the local neighbor VPAN information maintained by the coordinator, and maintains a table of global neighbor VPAN information that is shown in Table 1. Each item recorded in the global neighbor VPAN information and meaning corresponding to the item recorded are shown in the table. If a VLC device reports that a new neighbor VPAN is detected to the coordinator, or if the coordinator detects a new neighbor VPAN, the coordinator adds a VPAN descriptor and corresponding information to the table. If a new VLC device detects a neighbor VPAN that is in Table 1, the coordinator updates corresponding information of the VPAN descriptor in Table 1. If a VLC device reports to the coordinator that a neighbor VPAN that can be previously detected cannot be detected within the aging time, or a VLC device that can previously detect a neighbor VPAN leaves the VPAN, or the coordinator cannot detect, within the aging time, a neighbor VPAN that can be previously detected, the coordinator deletes, from the table, information that is corresponding to the coordinator or the VLC device and that is corresponding to the VPAN descriptor.

TABLE 1

| Item | Meaning |
| --- | --- |
| Quantity of neighbor VPANs | Quantity of neighbor VPANs that can be detected by the VPAN |
| VPAN descriptor [0] | Related information of a first neighbor VPAN that can be detected by the VPAN |
| Quantity of devices that detect the first neighbor VPAN | Quantity of devices that are on the VPAN and that can detect the first neighbor VPAN |
| Device address [0] | Short address of a first device that is on the VPAN and that can detect the first neighbor VPAN |
| Link quality [0] | Signal quality when the first device detects the first neighbor VPAN |
| . . . | |
| Device address [K-1] | Short address of a last device that is on the VPAN and that can detect the first neighbor VPAN |
| Link quality [K-1] | Signal quality when the last device detects the first neighbor VPAN |
| . . . | |
| VPAN descriptor [N-1] | Related information of a last neighbor VPAN that can be detected by the VPAN |
| Quantity of devices that detect the last neighbor VPAN | Quantity of devices that are on the VPAN and that can detect the last neighbor VPAN |
| Device address [0] | Short address of a first device that is on the VPAN and |

TABLE 1-continued

| Item | Meaning |
| --- | --- |
| | that can detect the last neighbor VPAN |
| Link quality [0] | Signal quality when the first device detects the last neighbor VPAN |
| ... | |
| Device address [L-1] | Short address of a last device that is on the VPAN and that can detect the last neighbor VPAN |
| Link quality [L-1] | Signal quality when the last device detects the last neighbor VPAN |

(2) After detecting a VPAN ID conflict event (that is, after a second VLC device receives a beacon in which a VPAN ID is the same as a VPAN ID of the VPAN and a coordinator address is different from a coordinator address of the VPAN, it is considered that a VPAN ID conflict event occurs currently), the second VLC device sends a VPAN ID conflict indication message to the coordinator.

Optionally, after detecting the VPAN ID conflict event, the second VLC device continues to perform detection for a time period according to the detection method described in Implementation 1, and then, sends the VPAN ID conflict indication message to the coordinator after completing the detection.

(3) After receiving the VPAN ID conflict indication message sent by the second VLC device, the coordinator selects a new VPAN ID for the VPAN based on global neighbor VPAN information maintained by the coordinator.

Optionally, before selecting the new VPAN ID for the VPAN, the coordinator first instructs a designated VLC device (for example, the first VLC device) on the VPAN to perform detection for a time period and then report VPAN ID information. The coordinator updates, based on the VPAN ID information reported by the first VLC device this time, the global neighbor VPAN information maintained by the coordinator, and selects the new VPAN ID for the VPAN based on updated global neighbor VPAN information. For a method in which the coordinator instructs the designated VLC device on the VPAN to perform detection for a time period and then report the VPAN ID information or to report the VPAN ID information immediately, reference may be to a corresponding description of a related manner in Implementation 3. Details are not described herein again.

Based on an embodiment, when the coordinator requests the designated VLC device on the VPAN to perform detection, several methods can be selected by the coordinator to designate the VLC device. For example, VLC devices of which addresses appear on the item "Device address" in Table 1 are selected as designated VLC devices. These VLC devices can detect a neighbor VPAN; therefore, when these VLC devices are used as designated VLC devices to perform detection, a probability that these VLC devices can detect a beacon of another VPAN is larger than a probability that a VLC device of which an address does not appear on the item.

Based on an embodiment, further, when the coordinator performs active scanning according to the prior art but does not find any beacon (or although some beacons are found), the coordinator still has a reason to suspect that beacons of some coordinators are not received by the coordinator in this scanning process. Therefore, the coordinator further instructs, according to the method described in Implementation 3, a VLC device to perform searching again, or the coordinator performs searching by using a backhaul link that is to be described as follows.

The foregoing is a description about an embodiment implemented from an interaction side of the method of the first VLC device and the coordinator that are on the VPAN. It can be understood that a first VLC device and a coordinator that separately participate in an executing action in an interaction process of the method shall also fall into the protection scope of set forth in the claims. From a perspective of the first VLC device side, the first VLC device may execute the following method process.

The first VLC device generates a reporting indication message when a VPAN ID conflict occurs on a VPAN. The reporting indication message includes VPAN ID information detected by the first VLC device.

The first VLC device is configured to send the reporting indication message to a coordinator.

Optionally, after detecting that the VPAN ID conflict occurs on the VPAN, the first VLC device detects neighbor VPAN information within a first preset time. The neighbor VPAN information carries the VPAN ID information. The first VLC device generates the reporting indication message. The reporting indication message is further used to report the VPAN ID conflict to the coordinator.

Optionally, after detecting that the VPAN ID conflict occurs on the VPAN, the first VLC device generates the reporting indication message. The reporting indication message is further used to report the VPAN ID conflict to the coordinator.

Optionally, the first VLC device receives a reporting request message sent by the coordinator. The reporting request message is used to request the VLC device to send detected neighbor VPAN information to the coordinator, the neighbor VPAN information includes the VPAN ID information, the reporting request message is a message sent by the coordinator to the first VLC device after the coordinator receives a VPAN ID conflict indication message, and the VPAN ID conflict indication message is a message sent by a second VLC device to the coordinator after the second VLC device detects that the VPAN ID conflict occurs on the VPAN.

The first VLC device generates the reporting indication message based on the detected neighbor VPAN information, and the neighbor VPAN information carries the VPAN ID information.

Optionally, the VPAN ID information is used by the coordinator to update global neighbor VPAN information based on the VPAN ID information so as to select a new VPAN ID based on updated global neighbor VPAN information. The global neighbor VPAN information is neighbor VPAN information maintained by the coordinator based on reported local neighbor VPAN information that is received and local neighbor VPAN information maintained by the coordinator; the reported local neighbor VPAN information is neighbor VPAN information that is maintained by at least one VLC device on the VPAN and that is reported, periodically or based on a trigger condition, to the coordinator; the local neighbor VPAN information maintained by the coordinator is neighbor VPAN information maintained by the coordinator; and the neighbor VPAN information includes VPAN ID information.

It can be understood that, for a method process executed by the first VLC device, reference may be correspondingly made to the foregoing specific implementations in the method embodiments shown in FIG. 3 to FIG. 5. Details are not described herein again.

From a prospective of the coordinator side, the coordinator may execute the following method process.

The coordinator receives, when a VPAN ID conflict occurs on a VPAN, a reporting indication message sent by a first VLC device. The reporting indication message includes VPAN ID information detected by the first VLC device.

The coordinator selects a new VPAN ID based on the VPAN ID information.

Optionally, the coordinator selects a VPAN ID that is different from a VPAN ID included in the VPAN ID information.

Optionally, the coordinator generates a coordinator realignment message and sends the coordinator realignment message to at least one VLC device on the VPAN. The coordinator realignment message includes the new VPAN ID and an effective time. The coordinator and the at least one VLC device use the new VPAN ID at the effective time.

Optionally, the reporting indication message is a message generated after the first VLC device detects, within a first preset time, neighbor VPAN information and the first VLC device detects that the VPAN ID conflict occurs on the VPAN, the neighbor VPAN information carries the VPAN ID information, and the reporting indication message is further used to report the VPAN ID conflict to the coordinator.

Optionally, the reporting indication message is a message generated after the first VLC device detects that the VPAN ID conflict occurs on the VPAN, and the reporting indication message is further used to report the VPAN ID conflict to the coordinator.

Optionally, the coordinator receives a VPAN ID conflict indication message sent by a second VLC device, and the VPAN ID conflict indication message is used to report the VPAN ID conflict to the coordinator.

The coordinator sends a reporting request message to the first VLC device. The reporting request message is used to request the VLC device to send detected neighbor VPAN information to the coordinator, and the neighbor VPAN information includes the VPAN ID information.

Optionally, the coordinator maintains local neighbor VPAN information.

The coordinator receives reported local neighbor VPAN information. The reported local neighbor VPAN information is neighbor VPAN information that is maintained by the at least one VLC device on the VPAN and that is reported, periodically or based on a trigger condition, to the coordinator, and the neighbor VPAN information includes VPAN ID information.

The coordinator maintains global neighbor VPAN information based on the reported local neighbor VPAN information that is received and the local neighbor VPAN information maintained by the coordinator. The coordinator updates the global neighbor VPAN information based on the VPAN ID information in the reporting indication message, and selects a new VPAN ID based on the updated global neighbor VPAN information.

It can be understood that, for a method process executed by the coordinator, reference may be correspondingly made to the foregoing specific implementations in the method embodiments shown in FIG. 3 to FIG. 5. Details are not described herein again.

Figure 6:
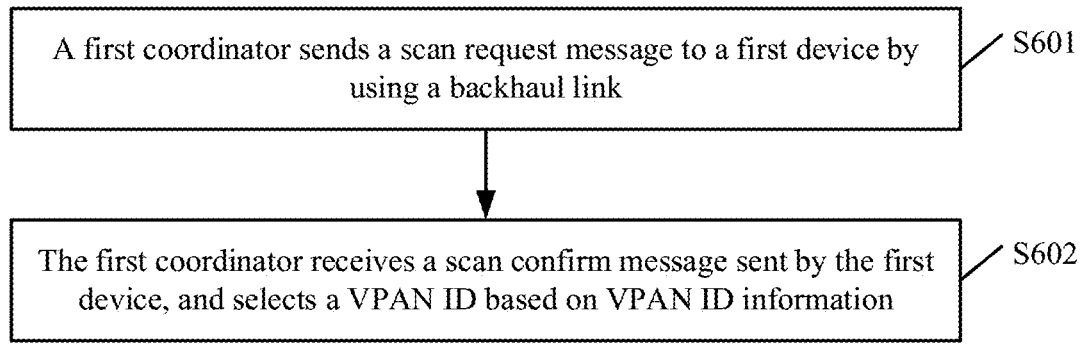
FIG. 6 is a schematic flowchart of another visible light-based communication method according to an embodiment of the application.

The foregoing method embodiments corresponding to FIG. 3 to FIG. 5 are mainly used to resolve a VPAN ID conflict that occurs on a VPAN. In the following embodiment, VPAN ID information of another VPAN is effectively obtained and a VPAN ID is properly selected mainly in a backhaul link-based implementation. Referring to FIG. 6, FIG. 6 is a schematic flowchart of another visible light-based communication method according to an embodiment of the application. The following describes the method from a single side of a first coordinator with reference to FIG. 6. As shown in FIG. 6, the method may include operation S601 and Operation S602.

Operation S601. The first coordinator sends a scan request message to a first device by using a backhaul backhaul link, where the first device includes a second coordinator and/or a central controller, the first device and the first coordinator are connected by using the backhaul link, and the scan request message is used to request VPAN ID information from the first device.

Specifically, the backhaul link includes a wired link or a wireless link, the wired link may include a power line communication PLC link, an Ethernet Ethernet link, or an optical fiber link, and the wireless link includes a Wi-Fi link, a cellular link, a WiMax link, a Bluetooth link, or a ZigBee link.

In a possible implementation, the first device includes the central controller, and the first coordinator further reports, periodically or based on a trigger condition, VPAN ID information of a VPAN on which the first coordinator resides to the central controller by using the backhaul link. That is, it is equivalent to that all coordinators connected to the central controller by using the backhaul link need to report VPAN ID information to the central controller periodically or based on a trigger condition, so that when a coordinator subsequently discovers a VPAN ID conflict and needs to obtain neighbor VPAN ID information, there may be a reference.

In a possible implementation, before the first coordinator sends the scan request message to the first device by using the backhaul link, the first coordinator receives a VPAN ID conflict indication message sent by a second device, and the VPAN ID conflict indication message is used to report a VPAN ID conflict to the first coordinator. That is, the first coordinator sends the scan request message to the first device under a premise that the first coordinator receives a conflict indication message from the second device (a VLC device on a VPAN on which the first coordinator resides).

In a possible implementation, that the first coordinator sends a scan request message to a first device by using a backhaul link is specifically as follows: Before establishing the VPAN, the first coordinator sends the scan request message to the first device by using the backhaul link. That is, at the beginning of establishing a VPAN corresponding to the first coordinator, the first coordinator takes precautions and learns of, in advance, a VPAN ID of another VPAN that is connected to the first coordinator, thereby avoiding that a VPAN ID conflict occurs after a VPAN ID is blindly selected to establish a VPAN.

Operation S602. The first coordinator receives a scan confirm message sent by the first device, and selects a VPAN ID based on the VPAN ID information, where the scan confirm message is sent to the first coordinator after the first device receives the scan request message, and the scan confirm message carries VPAN ID information maintained by the first device.

Specifically, the first device may be a coordinator, a central controller, or a combination thereof; therefore, the VPAN ID information maintained by the first device varies correspondingly. When the first device includes the second coordinator, the VPAN ID information maintained by the first device includes VPAN ID information of a VPAN on which the second coordinator resides. Each coordinator on the VPANs stores VPAN ID information of the VPAN; therefore, it is equivalent to that the first coordinator obtains, from each coordinator by using the backhaul link, VPAN ID information of a VPAN on which the coordinator resides. When the first device includes the central controller, the VPAN ID information maintained by the first device includes VPAN ID information of a VPAN on which a coordinator connected to the central controller by using the backhaul link resides. In this case, it is equivalent to that VPAN ID information of all VPANs is stored in the central controller; therefore, when the first coordinator needs to obtain related information, the first coordinator may directly obtain the related information from the central controller without sending a scan request to each coordinator.

In a possible implementation, after selecting the VPAN ID based on the VPAN ID information, the first coordinator generates a coordinator realignment message, and sends the coordinator realignment message to at least one VLC device on the VPAN. The coordinator realignment message includes the selected VPAN ID and an effective time. The coordinator and the at least one VLC device use the selected VPAN ID at the effective time.

In a possible implementation, after selecting the VPAN ID based on the VPAN ID information, the first coordinator broadcasts a beacon, and the beacon includes the selected VPAN ID. That is, when a VPAN is initially established and a VPAN ID is selected, a related device on the VPAN has not learned of the VPAN ID yet; therefore, a coordinator needs to broadcast a beacon that carries the selected VPAN ID, so that the related device learns of the VPAN ID and performs a subsequent interaction, such as synchronization or communication, based on the VPAN ID.

In a possible implementation, a specific implementation in which the first coordinator selects a VPAN ID based on the VPAN ID information is as follows: The first coordinator selects a VPAN ID that is different from a VPAN ID included in the VPAN ID information.

The following separately describes a specific execution process of an embodiment of the application in detail when the first device is the second coordinator or the central controller.

Figure 7:
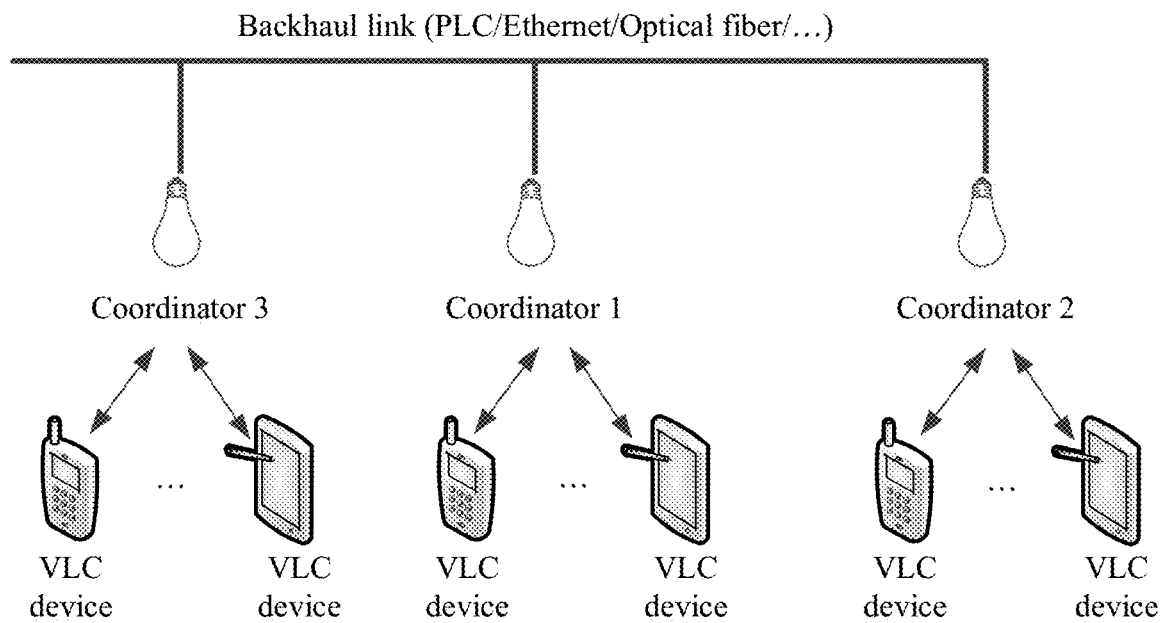
FIG. 7 is a diagram of a distributed LED light layout according to an embodiment of the application.
Figure 8:
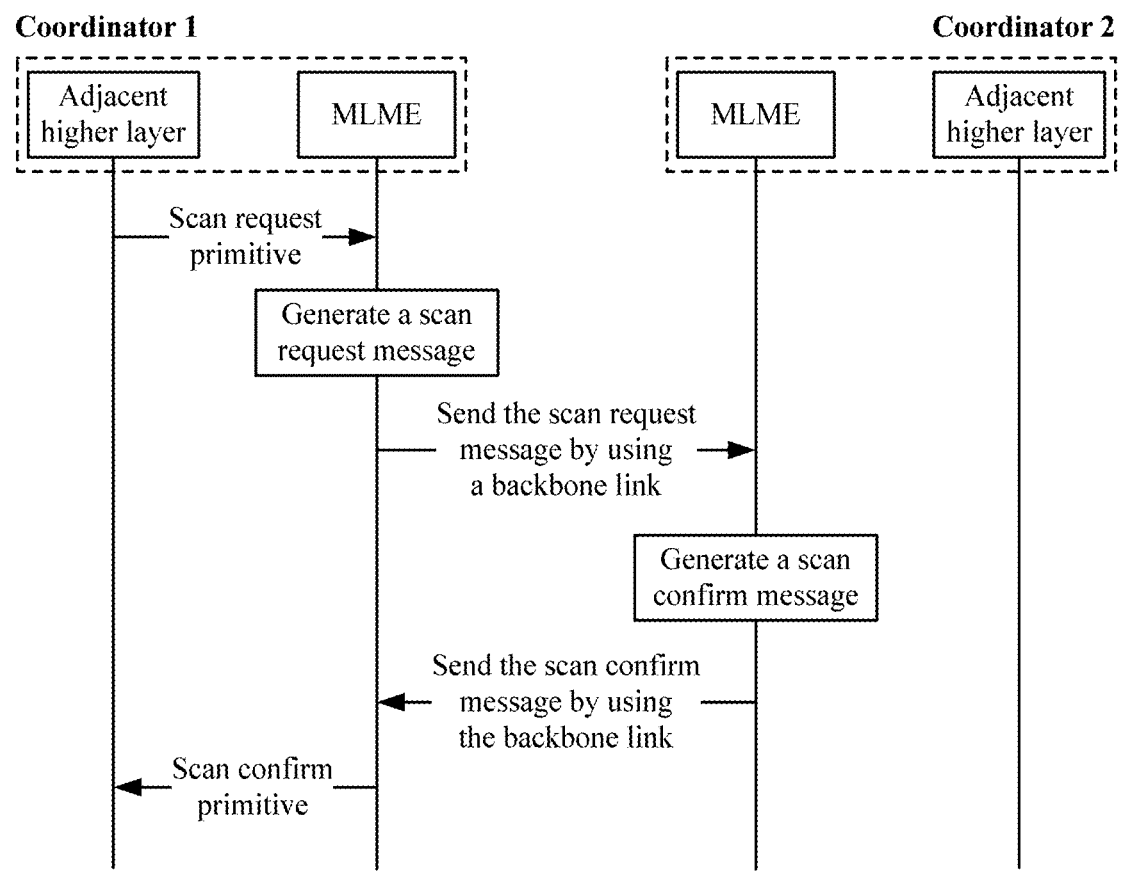
FIG. 8 is a schematic flowchart of an embodiment of another visible light-based communication method according to an embodiment of the application.

When the first device is the second coordinator (based on a distributed structure), FIG. 7 shows a distributed LED light (coordinator) layout. Each coordinator is an LED light. In FIG. 7, different coordinators are connected by using a backhaul link, and the backhaul link may be various wired connection links such as a power line communication (PLC) link, an Ethernet link, or an optical fiber link, or may be a wireless connection link such as a Wi-Fi link, a cellular link, a WiMax link, a Bluetooth link, or a ZigBee link. This is not specifically limited in the present application. For ease of description, in the following method description, a coordinator 1 (corresponding to the first coordinator) performs the method, that is, the coordinator 1 is a coordinator of a to-be-established VPAN, or a coordinator that needs to resolve a VPAN ID conflict. A problem to be resolved is how to make the coordinator 1 to receive a beacon sent from another coordinator, so as to discover a VPAN ID carried in the beacon and select an appropriate VPAN ID. It can be understood that this method is applicable to any coordinator in the drawing. That is, the first device may be any coordinator based on the foregoing distributed LED light layout. A flowchart of a specific execution process of operation S601 and S602 according to one embodiment is shown in FIG. 8. The specific execution process may be as follows:

(1) After receiving a scan request primitive of an adjacent higher layer, an MLME of the coordinator 1 generates a scan request message.

(2) The MLME of the coordinator 1 sends the scan request message to the second coordinator by using the backhaul link.

(3) The second coordinator (assuming that the second coordinator is a coordinator 2) receives the scan request message.

(4) An MLME of the coordinator 2 generates a scan confirm message and sends the scan confirm message to the coordinator 1 by using the backhaul link, where the scan confirm message includes VPAN ID information of a VPAN on which the coordinator 2 resides.

(5) After receiving the scan confirm message, the MLME of the coordinator 1 generates a scan confirm primitive, and provides, by using the primitive, the received VPAN ID information of another VPAN for the adjacent higher layer of the coordinator 1. In this way, a scanning process of the coordinator 1 is complete.

Figure 9:
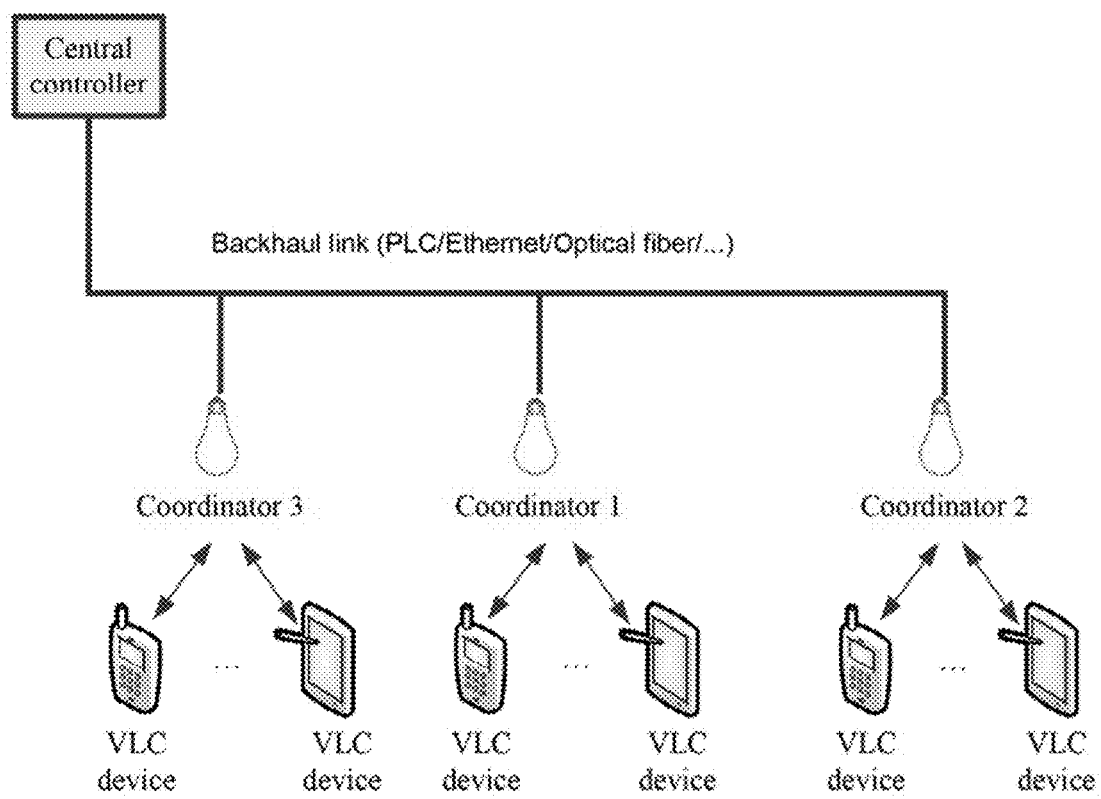
FIG. 9 is a diagram of a centralized LED light layout according to an embodiment of the application.
Figure 10:
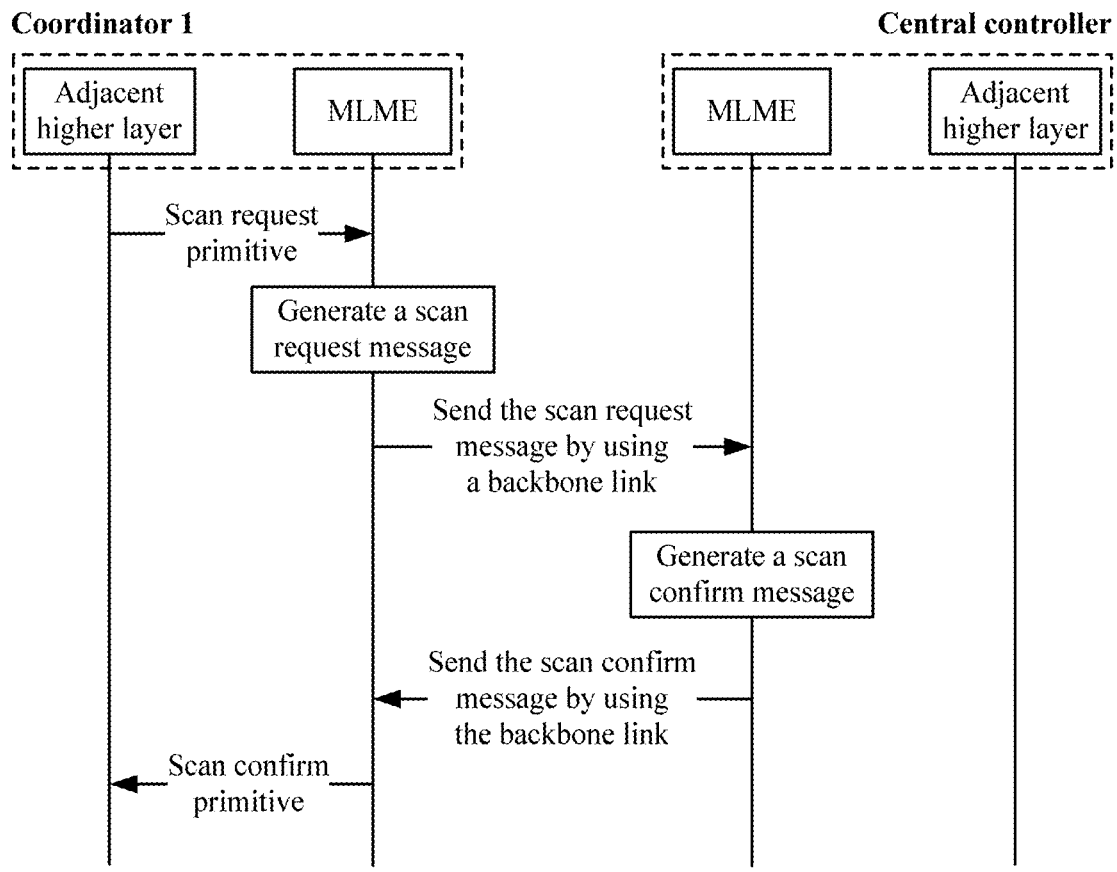
FIG. 10 is a schematic flowchart of another embodiment of another visible light-based communication method according to an embodiment of the application.

When the first device is the central controller (based on a centralized structure), LED lights are deployed based on a centralized LED light layout shown in FIG. 9. The central controller in FIG. 9 is connected to coordinators by using a backhaul link, and the central controller is responsible for coordinating interference between VPANs and device switching between different VPANs. The central controller has basic information of each VPAN, and the information includes at least a VPAN ID and/or a coordinator address of a VPAN, or the like. An approach in which the central controller obtains this information is as follows: When VPANs are established, coordinators of the VPANs report the information to the central controller by using the backhaul link. In a VPAN running process, if the foregoing information changes, the coordinators may also report the foregoing information to the central controller again by using the backhaul link. Based on the foregoing centralized LED light layout, a specific execution process of operation S601 and operation S602 in an embodiment of the application may be as follows:

A flowchart of the specific execution process of operation S601 and operation S602 in an embodiment of the application is shown in FIG. 10. The specific execution process may be as follows:

(1) After receiving a scan request primitive of an adjacent higher layer, an MLME of a coordinator 1 generates a scan request message.

(2) The MLME of the coordinator 1 sends the scan request message to the central controller by using the backhaul link.

(3) The central controller receives the scan request message by using the backhaul link.

(4) The central controller generates a scan confirm message and sends the scan confirm message to the coordinator 1 by using the backhaul link, where the scan confirm message includes VPAN ID information, of all VPANs, obtained by the central controller.

(5) After receiving the scan confirm message, the MLME of the coordinator 1 generates a scan confirm primitive, and provides, by using the primitive, the received VPAN ID information of another VPAN for the adjacent higher layer of the coordinator 1. In this way, a scanning process of the coordinator 1 is complete. To implement the foregoing solutions of an embodiment of the application better, the present application further provides a related device configured to help implement the foregoing solutions.

With reference to the accompany drawings, the following describes an apparatus configured to implement the foregoing method embodiments according to an embodiment of the application.

Figure 11:
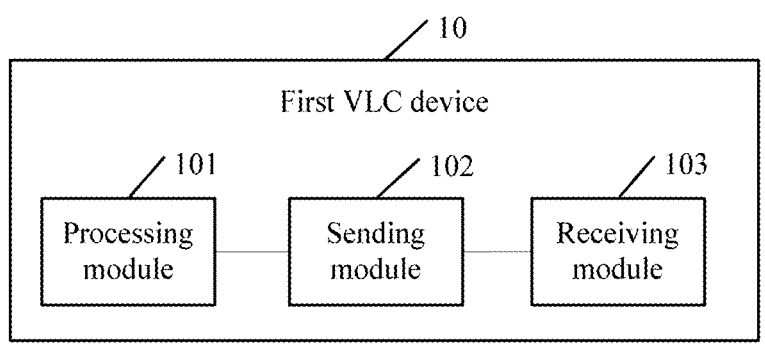
FIG. 11 is a schematic structural diagram of a first VLC device according to an embodiment of the application.

Referring to FIG. 11, FIG. 11 is a schematic structural diagram of a first VLC device according to an embodiment of the application. The device 10 may include a processing module 101 and a sending module 102.

The processing module 101 is configured to generate a reporting indication message when a VPAN ID conflict occurs on a VPAN, where the reporting indication message includes VPAN ID information detected by the first VLC device.

The sending module 102 is configured to send the reporting indication message to a coordinator.

In an optional solution, the processing module 101 is further configured to:

detect, after detecting that the VPAN ID conflict occurs on the VPAN, neighbor VPAN information within a first preset time, where the neighbor VPAN information carries the VPAN ID information; and generate the reporting indication message, where the reporting indication message is further used to report the VPAN ID conflict to the coordinator.

In another optional solution, the processing module 101 is further configured to:

generate the reporting indication message after detecting that the VPAN ID conflict occurs on the VPAN, where the reporting indication message is further used to report the VPAN ID conflict to the coordinator.

In another optional solution, the first VLC device 10 may further include a receiving module 103.

The receiving module 103 is configured to receive a reporting request message sent by the coordinator, where the reporting request message is used to request the VLC device to send detected neighbor VPAN information to the coordinator, the neighbor VPAN information includes the VPAN ID information, the reporting request message is a message sent by the coordinator to the first VLC device after the coordinator receives a VPAN ID conflict indication message, and the VPAN ID conflict indication message is a message sent by a second VLC device to the coordinator after the second VLC device detects that the VPAN ID conflict occurs on the VPAN.

The processing module 101 is further configured to generate the reporting indication message based on the detected neighbor VPAN information, where the neighbor VPAN information carries the VPAN ID information.

In another optional solution, the VPAN ID information is used by the coordinator to update global neighbor VPAN information based on the VPAN ID information so as to select a new VPAN ID based on updated global neighbor VPAN information; the global neighbor VPAN information is neighbor VPAN information maintained by the coordinator based on reported local neighbor VPAN information that is received and local neighbor VPAN information maintained by the coordinator; the reported local neighbor VPAN information is neighbor VPAN information that is maintained by at least one VLC device on the VPAN and that is reported, periodically or based on a trigger condition, to the coordinator; the local neighbor VPAN information maintained by the coordinator is neighbor VPAN information maintained by the coordinator; and the neighbor VPAN information includes VPAN ID information.

It can be understood that, for functions of modules in the first VLC device 10, reference may be correspondingly made to the foregoing specific implementations in the method embodiments shown in FIG. 3 to FIG. 9. Details are not described herein again.

In an embodiment, the first VLC device 10 may be presented in a module form. Herein, the "module" may be an application-specific integrated circuit (application-specific integrated circuit, ASIC), a processor and a memory that execute one or more pieces of software or firmware programs, an integrated logical circuit, and/or another component that can provide the foregoing functions.

Figure 12:
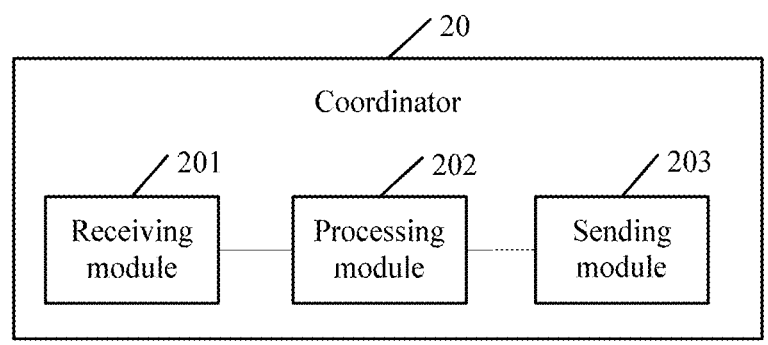
FIG. 12 is a schematic structural diagram of a coordinator according to an embodiment of the application.

Referring to FIG. 12, FIG. 12 is a schematic structural diagram of a coordinator according to an embodiment of the application. The device 20 may include a receiving module 201 and a processing module 202.

The receiving module 201 is configured to receive, when a VPAN ID conflict occurs on a VPAN, a reporting indication message sent by a first VLC device, where the reporting indication message includes VPAN ID information detected by the first VLC device.

The processing module 202 is configured to select a new VPAN ID based on the VPAN ID information.

In an optional solution, the processing module 202 is specifically configured to:

select a VPAN ID that is different from a VPAN ID included in the VPAN ID information.

In another optional solution, the processing module 202 is further configured to:

generate a coordinator realignment message, and send the coordinator realignment message to at least one VLC device on the VPAN, where the coordinator realignment message includes the new VPAN ID and an effective time, and the coordinator and the at least one VLC device use the new VPAN ID at the effective time.

In another optional solution, the reporting indication message is a message generated after the first VLC device detects, within a first preset time, neighbor VPAN information and the first VLC device detects that the VPAN ID conflict occurs on the VPAN, the neighbor VPAN information carries the VPAN ID information, and the reporting indication message is further used to report the VPAN ID conflict to the coordinator.

In another optional solution, the reporting indication message is a message generated after the first VLC device detects that the VPAN ID conflict occurs on the VPAN, and the reporting indication message is further used to report the VPAN ID conflict to the coordinator.

In another optional solution, the device may further include a sending module 203.

The receiving module 201 is further configured to receive a VPAN ID conflict indication message sent by a second VLC device, where the VPAN ID conflict indication message is used to report the VPAN ID conflict to the coordinator.

The sending module 203 is configured to send a reporting request message to the first VLC device, where the reporting request message is used to request the VLC device to send detected neighbor VPAN information to the coordinator, and the neighbor VPAN information includes the VPAN ID information.

In another optional solution, the processing module 202 is further configured to maintain local neighbor VPAN information.

The receiving module 201 is further configured to receive reported local neighbor VPAN information, where the reported local neighbor VPAN information is neighbor VPAN information that is maintained by the at least one VLC device on the VPAN and that is reported, periodically or based on a trigger condition, to the coordinator, and the neighbor VPAN information includes VPAN ID information.

The processing module 202 is further configured to: maintain global neighbor VPAN information based on the reported local neighbor VPAN information that is received and the local neighbor VPAN information maintained by the coordinator. The selecting module is specifically configured to: update the global neighbor VPAN information based on the VPAN ID information in the reporting indication message, and select a new VPAN ID based on the updated global neighbor VPAN information.

It can be understood that, for functions of modules in the coordinator 20, reference may be correspondingly made to specific implementations in the method embodiments shown in FIG. 3 to FIG. 9. Details are not described herein again.

In an embodiment, the coordinator 20 is presented in a module form. Herein, the "module" may be an application-specific integrated circuit (ASIC), a processor and a memory that execute one or more pieces of software or firmware programs, an integrated logical circuit, and/or another component that can provide the foregoing functions.

Figure 13:
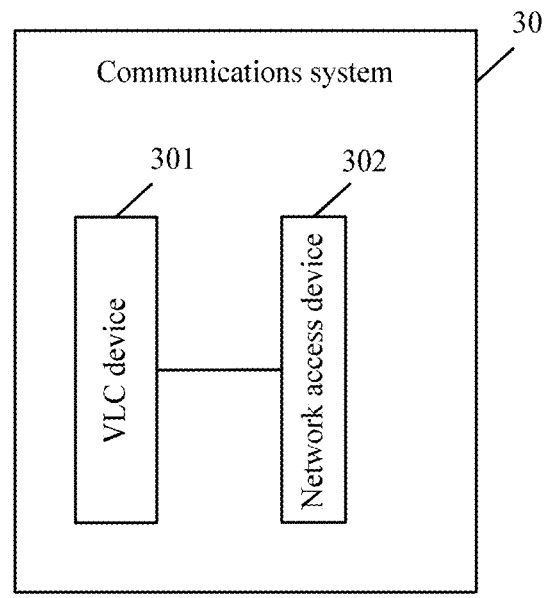
FIG. 13 is a schematic structural diagram of a communications system according to an embodiment of the application.

FIG. 13 shows a schematic structural diagram of a communications system according to an embodiment of the application. The system 30 includes a VLC device 301 and a network access device 302.

The VLC device 301 may be the first VLC device 10 in the foregoing embodiment shown in FIG. 11, and the network access device 302 may be the coordinator 20 in the foregoing embodiment shown in FIG. 12. It can be understood that the system 30 in this embodiment of the application may further include a device such as another VLC device or a central controller.

Figure 14:
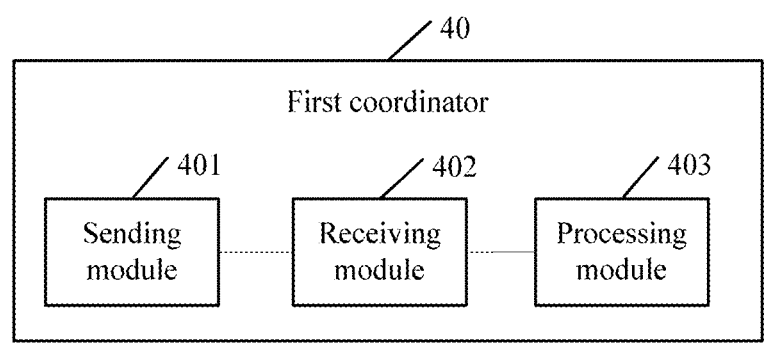
FIG. 14 is a schematic structural diagram of a first coordinator according to an embodiment of the application.

Referring to FIG. 14, FIG. 14 is a schematic structural diagram of a first coordinator according to an embodiment of the application. The device 40 may include a sending module 401, a receiving module 402, and a processing module 403.

The sending module 401 is configured to send a scan request message to a first device by using a backhaul link, where the first device includes a second coordinator and/or a central controller, the first device and the first coordinator are connected by using the backhaul link, and the scan request message is used to request VPAN ID information from the first device.

The receiving module 402 is configured to receive a scan confirm message sent by the first device, where the scan confirm message is sent to the first coordinator after the first device receives the scan request message, and the scan confirm message carries VPAN ID information maintained by the first device.

The processing module 403 is configured to select a VPAN ID based on the VPAN ID information.

In an optional solution, the first device includes the second coordinator; and the VPAN ID information maintained by the first device includes VPAN ID information of a VPAN on which the second coordinator resides.

In another optional solution, the first device includes the central controller; and the VPAN ID information maintained by the first device includes VPAN ID information of a VPAN on which a coordinator connected to the central controller by using the backhaul link resides.

In another optional solution, the sending module 401 is further configured to:
report, periodically or based on a trigger condition, VPAN ID information of a VPAN on which the first coordinator resides to the central controller by using the backhaul link.

In another optional solution, the receiving module 402 is further configured to:
receive a VPAN ID conflict indication message sent by a second device, where the VPAN ID conflict indication message is used to report a VPAN ID conflict to the first coordinator.

In another optional solution, the processing module 403 is further configured to:
after selecting the VPAN ID based on the VPAN ID information, generate a coordinator realignment message, and send the coordinator realignment message to at least one VLC device on the VPAN, where the coordinator realignment message includes the selected VPAN ID and an effective time, and the coordinator and the at least one VLC device use the selected VPAN ID at the effective time.

In another optional solution, the sending module 401 is specifically configured to: before establishing the VPAN, send the scan request message to the first device by using the backhaul backhaul link.

In another optional solution, the sending module 401 is further configured to:
broadcast a beacon after selecting the VPAN ID based on the VPAN ID information, where the beacon includes the selected VPAN ID.

In another optional solution, the processing module 403 is specifically configured to:
select a VPAN ID that is different from a VPAN ID included in the VPAN ID information.

In another optional solution, the backhaul link includes a wired link or a wireless link, the wired link includes a power line communication PLC link, an Ethernet Ethernet link, or an optical fiber link, and the wireless link includes a Wi-Fi link, a cellular link, a WiMax link, a Bluetooth link, or a ZigBee link.

It can be understood that, for functions of modules in the first coordinator 40, reference may be correspondingly made to specific implementations in the method embodiments shown in FIG. 3 to FIG. 9. Details are not described herein again.

In an embodiment, the first coordinator is presented in a module form. Herein, the "module" may be an application-specific integrated circuit (ASIC), a processor and a memory that execute one or more pieces of software or firmware programs, an integrated logical circuit, and/or another component that can provide the foregoing functions.

Figure 15:
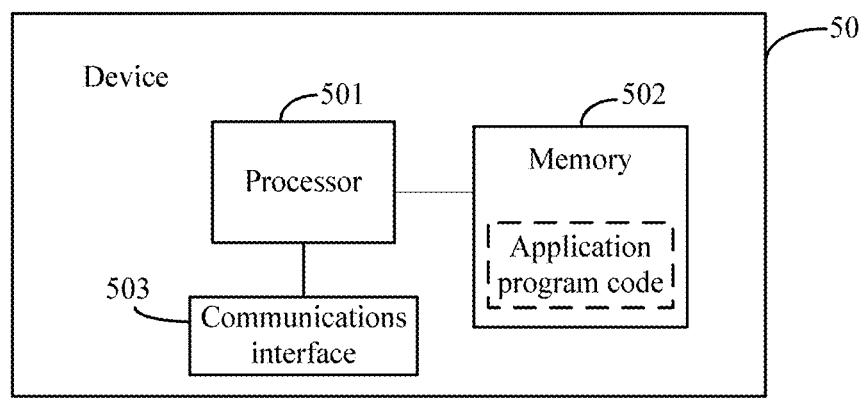
FIG. 15 is a schematic structural diagram of a device according to an embodiment of the application.

As shown in FIG. 15, the first VLC device 10, the coordinator 20, the first coordinator 40, and related devices such as the second VLC device, the second coordinator, or the central controller may be all implemented in a structure shown in FIG. 15. The device 50 includes at least one processor 501, at least one memory 502, and at least one communications interface 503. In addition, the device may further include general components such as an antenna, and details are not described herein.

The processor 501 may be a central processing unit (CPU), a microprocessor, an ASIC, or one or more integrated circuits for controlling execution of the foregoing solution program according to an embodiment of the application.

The communications interface 503 is configured to communicate with another device or a communications network such as an Ethernet, a radio access network (RAN), or a wireless local area network (WLAN).

The memory 502 may be a read-only memory (ROM) or another type of static storage device that may store static information and instructions, or a random access memory (RAM) or another type of dynamic storage device that may store information and instructions, and may also be an electrically erasable programmable read-only memory (EEPROM), a read-only optical disc (Compact Disc Read-Only Memory, CD-ROM), another optical disc storage medium, optical disc storage medium (including a compact disc, a laser disc, an optical disc, a digital versatile disc, a Blu-ray disc, or the like), or magnetic disc storage medium, another magnetic storage device, or any other medium that can be used to carry or store expected program code in a structural form of an instruction or data and that can be accessed by a computer, but is not limited thereto. The memory may exist independently, and is connected to the processor by using the bus. The memory may also be integrated with the processor.

The memory 502 is configured to store and execute application program code of the foregoing solution, and the processor 501 controls execution. The processor 501 is configured to execute the application program code stored in the memory 502.

When the device shown in FIG. 15 is a first VLC device, the code stored in the memory 502 may be used to perform the foregoing provided visible light-based communication method that is performed by the first VLC device, for example, sending a reporting indication message to a coordinator when a VPAN ID conflict occurs on a VPAN, where the reporting indication message includes VPAN ID information detected by the first VLC device.

When the device shown in FIG. 15 is a coordinator, the code stored in the memory 502 may be used to perform the foregoing provided visible light-based communication method that is performed by the coordinator, for example, receiving, when a VPAN ID conflict occurs on a VPAN, a reporting indication message sent by a first VLC device, where the reporting indication message includes VPAN ID information detected by the first VLC device, and selecting, by the coordinator, a new VPAN ID based on the VPAN ID information.

When the device shown in FIG. 15 is a first coordinator, the code stored in the memory 502 may be used to perform the foregoing provided visible light-based communication method that is performed by the first coordinator, for example, sending a scan request message to a first device by using a backhaul link, where the first device includes a second coordinator and/or a central controller, the first device and the first coordinator are connected by using the backhaul link, and the scan request message is used to request VPAN ID information from the first device; and receiving a scan confirm message sent by the first device, and selecting a VPAN ID based on the VPAN ID information, where the scan confirm message is sent to the first coordinator after the first device receives the scan request message, and the scan confirm message carries VPAN ID information maintained by the first device.

It can be understood that, for functions of functional modules in the device 50, reference may be correspondingly made to the specific implementations in the method embodiments shown in FIG. 3 to FIG. 9. Details are not described herein again.

An embodiment of the application further provides a computer storage medium. The computer storage medium may store a program, and when the program is executed, a part or all of the operations of any visible light-based communication method described in the foregoing method embodiments may be performed.

Although methods, apparatuses and systems are described in the present application with reference to exemplary embodiments, a person of ordinary skill in the art may understand and implement another variation of the disclosed embodiments by viewing the accompanying drawings, disclosed content, and the accompanying claims. In the claims, "comprising" does not exclude another component or another operation, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person of ordinary skill in the art should understand that the embodiments of the application may be provided as a method, an apparatus (device), or a computer program product. Therefore, embodiments of the application may use a form of hardware only embodiments, software only embodiments, or embodiments with a combination of software and hardware. Moreover, embodiments of the application may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another allocation form, such as by using the Internet or another wired or wireless telecommunications system.

The present application describes embodiments of methods, apparatuses (devices), systems, computer program products with reference to the flowcharts and/or block diagrams. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or any other programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Although the present application is described with reference to specific features and the embodiments thereof, various modifications and combinations may be made to those embodiments without departing from the spirit and scope set forth in the following claims. The present application is intended to cover these modifications and variations provided that they fall within the protection scope defined by the following claims and their equivalent technologies.

What is claimed is:

1. A visible light communication personal area network (VPAN) communications system, comprising a first visible light communication (VLC) device and a coordinator, wherein:
the first VLC device is configured to:
generate a reporting indication message when a VPAN ID conflict occurs on the VPAN, wherein the reporting indication message comprises VPAN ID information comprising at least one of a VPAN identifier of a neighbor VPAN or a coordinator address of the neighbor VPAN detected by the first VLC device, and send the reporting indication message to the coordinator; and
the coordinator is configured to:
receive the reporting indication message from first VLC device, wherein the reporting indication message comprises VPAN ID information detected by the first VLC device, and select a new VPAN ID based on the VPAN ID information.

2. The VPAN communications system according to claim 1, wherein the first VLC device is configured to:
detect, after detecting that the VPAN ID conflict occurs on the VPAN, neighbor VPAN information within a first preset time, wherein the neighbor VPAN information carries the VPAN ID information; and generate the reporting indication message, wherein the reporting indication message is used to report the VPAN ID conflict to the coordinator.

3. The VPAN communications system according to claim 1, wherein the first VLC device is configured to:
generate the reporting indication message after detecting that the VPAN ID conflict occurs on the VPAN, wherein the reporting indication message is used to report the VPAN ID conflict to the coordinator.

4. The VPAN communications system according to claim 1, wherein the coordinator is configured to:
select a VPAN ID that is different from a VPAN ID comprised in the VPAN ID information.

5. The VPAN communications system according to claim 1, wherein the coordinator is configured to:
generate a coordinator realignment message, and send the coordinator realignment message to the first VLC device on the VPAN, wherein the coordinator realignment message comprises the new VPAN ID and an effective time, and the coordinator and the first device use the new VPAN ID at the effective time.

6. The VPAN communications system according to claim 1, wherein:
the communications system further comprises a second VLC device;
the coordinator is configured to:
receive a VPAN ID conflict indication message from the second VLC device, wherein the VPAN ID conflict indication message is used to report the VPAN ID conflict to the coordinator, and send a reporting request message to the first VLC device; and
the first VLC device is configured to:
receive the reporting request message from the coordinator, wherein the reporting request message is used to request the first VLC device to send detected neighbor VPAN information to the coordinator, wherein the neighbor VPAN information comprises the VPAN ID information, and generate the reporting indication message based on the detected neighbor VPAN information, wherein the neighbor VPAN information carries the VPAN ID information.

7. The VPAN communications system according to claim 1, wherein the coordinator is configured to:
maintain local neighbor VPAN information;
receive reported local neighbor VPAN information, wherein the reported local neighbor VPAN information is neighbor VPAN information that is maintained by at least one VLC device on the VPAN and that is reported, periodically or based on a trigger condition, to the coordinator, and the neighbor VPAN information comprises VPAN ID information; and
maintain global neighbor VPAN information based on the reported local neighbor VPAN information that is received and the local neighbor VPAN information maintained by the coordinator, update the global neighbor VPAN information based on the VPAN ID information in the reporting indication message, and select a new VPAN ID based on the updated global neighbor VPAN information.

8. A visible light communication (VLC) device, wherein the VLC device accesses a visible light communication personal area network (VPAN) by using a coordinator, and the VLC device is a first VLC device and comprises:
a memory storing instructions; and
a processor coupled to the memory to execute the instructions to:
generate a reporting indication message when a VPAN ID conflict occurs on the VPAN, wherein the reporting indication message comprises VPAN ID information comprising at least one of a VPAN identifier of a neighbor VPAN or a coordinator address of the neighbor VPAN detected by the first VLC device; and
send the reporting indication message to the coordinator.

9. The device according to claim 8, wherein the processor coupled to the memory to execute the instructions to:
detect, after detecting that the VPAN ID conflict occurs on the VPAN, neighbor VPAN information within a first preset time, wherein the neighbor VPAN information carries the VPAN ID information; and generate the reporting indication message, wherein the reporting indication message is used to report the VPAN ID conflict to the coordinator.

10. The device according to claim 8, wherein the processor coupled to the memory to execute the instructions to:
generate the reporting indication message after detecting that the VPAN ID conflict occurs on the VPAN, wherein the reporting indication message is used to report the VPAN ID conflict to the coordinator.

11. The device according to claim 8, wherein the processor coupled to the memory to execute the instructions to:
receive a reporting request message sent by the coordinator, wherein the reporting request message is used to request the VLC device to send detected neighbor VPAN information to the coordinator, wherein the neighbor VPAN information comprises the VPAN ID information; and generate the reporting indication message based on the detected neighbor VPAN information, wherein the neighbor VPAN information carries the VPAN ID information.

12. A network access device, wherein the network access device is configured to provide visible light communication personal area network (VPAN) access for a visible light communication (VLC) device, and the network access device is a coordinator and comprises:
a memory storing instructions; and
a processor coupled to the memory to execute the instructions to:
receive, when a VPAN ID conflict occurs on a VPAN, a reporting indication message sent by a first VLC device, wherein the reporting indication message comprises VPAN ID information comprising at least one of a VPAN identifier of a neighbor VPAN or a coordinator address of the neighbor VPAN detected by the first VLC device; and
select a new VPAN ID based on the VPAN ID information.

13. The device according to claim 12, wherein the processor coupled to the memory to execute the instructions to:
select a VPAN ID that is different from a VPAN ID comprised in the VPAN ID information.

14. The device according to claim 12, wherein the processor coupled to the memory to execute the instructions to:
generate a coordinator realignment message, and send the coordinator realignment message to at least one VLC device on the VPAN, wherein the coordinator realignment message comprises the new VPAN ID and an effective time, and the coordinator and the at least one VLC device use the new VPAN ID at the effective time.

15. The device according to claim 12, wherein the processor coupled to the memory to execute the instructions to:
receive a VPAN ID conflict indication message sent by a second VLC device, wherein the VPAN ID conflict indication message is used to report the VPAN ID conflict to the coordinator; and
send a reporting request message to the first VLC device, wherein the reporting request message is used to request the first VLC device to send detected neighbor VPAN information to the coordinator, and wherein the neighbor VPAN information comprises the VPAN ID information.

16. The device according to claim 12, wherein the processor coupled to the memory to execute the instructions to:
maintain local neighbor VPAN information;
receive reported local neighbor VPAN information, wherein the reported local neighbor VPAN information is neighbor VPAN information that is maintained by the at least one VLC device on the VPAN and that is reported, periodically or based on a trigger condition, to the coordinator, and the neighbor VPAN information comprises VPAN ID information; and
maintain global neighbor VPAN information based on the reported local neighbor VPAN information that is received and the local neighbor VPAN information maintained by the coordinator, update the global neighbor VPAN information based on the VPAN ID information in the reporting indication message, and select a new VPAN ID based on the updated global neighbor VPAN information.

* * * * *